US012602506B2

(12) United States Patent
Khan et al.

(10) Patent No.: US 12,602,506 B2
(45) Date of Patent: Apr. 14, 2026

(54) SYSTEM AND METHOD FOR TRANSFORMING AN ELECTRONIC FILE INTO A RIGHTS CONTROLLED AND SOCIAL DOCUMENT

(71) Applicants: Zafar Khan, Redondo Beach, CA (US); Terrance Tomkow, Los Angeles, CA (US)

(72) Inventors: Zafar Khan, Redondo Beach, CA (US); Terrance Tomkow, Los Angeles, CA (US)

( * ) Notice: Subject to any disclaimer, the term of this patent is extended or adjusted under 35 U.S.C. 154(b) by 153 days.

(21) Appl. No.: 18/134,480

(22) Filed: Apr. 13, 2023

(65) Prior Publication Data

US 2024/0346169 A1 Oct. 17, 2024

Related U.S. Application Data

(60) Provisional application No. 63/363,014, filed on Apr. 14, 2022.

(51) Int. Cl.
*G06F 21/62* (2013.01)
*G06F 21/60* (2013.01)

(52) U.S. Cl.
CPC ........ *G06F 21/6227* (2013.01); *G06F 21/602* (2013.01)

(58) Field of Classification Search
CPC .............. G06F 21/6227; G06F 21/602; G06F 2221/2107; G06F 21/62; G06F 21/6209; G06F 2221/2141; G06F 2221/2143; G06F 2211/007; G06F 2211/008

USPC .......................................................... 726/27
See application file for complete search history.

(56) References Cited

U.S. PATENT DOCUMENTS

| | | | |
|---|---|---|---|
| 7,660,989 B2 | 2/2010 | Tomkow | |
| 7,840,802 B1 * | 11/2010 | Shapiro | G06F 21/6218 |
| | | | 713/165 |
| 8,549,327 B2 * | 10/2013 | Mayer | G06Q 10/06 |
| | | | 726/19 |
| 2005/0229258 A1 * | 10/2005 | Pigin | G06F 21/64 |
| | | | 714/E11.207 |
| 2007/0156738 A1 * | 7/2007 | Ball | G06F 21/6227 |
| 2009/0205017 A1 * | 8/2009 | Yabe | G06F 21/6209 |
| | | | 726/1 |
| 2010/0228989 A1 * | 9/2010 | Neystadt | G06F 21/6209 |
| | | | 713/185 |

(Continued)

*Primary Examiner* — Catherine Thiaw
*Assistant Examiner* — Amir Mahdi Hajiabbasi
(74) *Attorney, Agent, or Firm* — Schlee IP International; Alexander R. Schlee; Pascal A. Schlee

(57) ABSTRACT

An electronic document transformation and sharing system and method that allows a document originator control over an electronic document shared by the document originator with at least one recipient. An input device receives an original electronic document and document-specific controls instructions pertaining to said original electronic document. By transformation, a new encrypted transformation document is created from an original electronic document, the encrypted transformation document having a transaction ID and controls instructions embedded. A recipient, if authorized, may view the encrypted transformation document after decryption within the limits set by the controls instructions such as time span over which the document may be viewed or the number of times it may be viewed.

15 Claims, 17 Drawing Sheets

(56)            References Cited

U.S. PATENT DOCUMENTS

| | | | |
|---|---|---|---|
| 2012/0173612 A1* | 7/2012 | Vegesna-Venkata | ......................... H04L 67/143 709/203 |
| 2014/0075206 A1* | 3/2014 | Garcia | ................... H04L 63/105 713/193 |
| 2014/0195825 A1* | 7/2014 | Li, I | ........................ G06F 21/00 713/193 |
| 2015/0143114 A1* | 5/2015 | Chujo | ................... G06F 21/606 713/165 |
| 2017/0302653 A1* | 10/2017 | Ortner | ................. H04L 63/0435 |
| 2018/0007546 A1* | 1/2018 | Anderson | ............... H04L 67/10 |
| 2018/0260578 A1* | 9/2018 | Orloff | ................. G06F 21/6209 |
| 2018/0307855 A1* | 10/2018 | Dogu | ...................... G06F 16/16 |
| 2020/0097443 A1* | 3/2020 | Kamiya | .............. G06F 16/1794 |
| 2020/0242262 A1* | 7/2020 | Kumbhashi | ......... G06F 21/6218 |
| 2020/0394322 A1* | 12/2020 | Ramos | ................... G06F 21/64 |
| 2021/0377229 A1* | 12/2021 | Dogu | ...................... H04L 63/08 |
| 2022/0012348 A1* | 1/2022 | Kirkwood | ............. G06F 21/602 |
| 2023/0052325 A1* | 2/2023 | Katoch | ............... G06F 15/0266 |
| 2024/0056291 A1* | 2/2024 | Thomas | ............... H04L 9/0891 |

* cited by examiner

21. RPD
File
Receiver

600

Rpost Global - Direct reseller.html
253 KB

PROTECTED DOCS

The attachment was sent in RPD format for enhanced security.

700

30. Input Device for Receiving Encrypted Content of RPD from External User Request to Access 22. RPD File Viewer

800

22. RPD File Viewer

SYSTEM AND METHOD FOR TRANSFORMING AN ELECTRONIC FILE INTO A RIGHTS CONTROLLED AND SOCIAL DOCUMENT

FIELD

This invention relates to the field of Information Rights Management (IRM), specifically in the subsectors of Electronic Digital Rights Management (EDRM) and in its subsectors of Electronic Document Rights Management and Document Security, as well as the field of Enterprise Output Management (EOM) software and systems.

BACKGROUND

There is a category of information rights management or digital rights management software applications that are designed to add controls to a file such that the original document owner may control file access, for instance by revoking or expiring the file. This technology has become ubiquitous within the online entertainment industry as a measure for protecting copyrights related to music and video file intellectual property. This permits, for example, online video "renting" where the video may be downloaded by an end user and expired after a set period of time. These videos or music files require compatible companion software by the viewer to play—and thus for the copyright enforcer to revoke or expire access.

With electronic document technologies, three main types of information rights management or digital rights management software are employed in the market. These are sometimes referred to as electronic document rights management software when centered on use with electronic documents. The systems that have been commercialized to date fall within three categories:

Category A requires "Same Licensing Plan" access, meaning viewers need to use the same software as the Originator with the proper licensed service plans and rights to permit viewing of the rights protected document and therefore enable the controls (e.g., Microsoft's Azure Information Rights Management software). Under this model, the viewer is required to incur the costs of the proper software and the proper premium software license (e.g. Microsoft).

Category B requires "Install App" companion software access, meaning the viewer must install a proprietary app to view the Originator's documents.

Category C requires "Centralized Storage" access, meaning the documents are stored in a shared repository and viewable in that repository after a viewer creates an account and logs in.

A major shortcoming of "Same Licensing Plan" systems is that they impose software installations and costs on the viewer. In addition, this system has the added complexity of determining who has what software versions, and who should be billed for the cost of upgrading to the proper licensing plans. This scenario is even more untenable if opting to transmit to external parties outside of the control of the Originator's organization.

A major shortcoming of "Install App" companion software systems is that they force viewers to install and learn how to use obscure third-party software to access the files. This scenario is even more untenable if the intended viewer is part of an organization that restricts unvetted downloads of software to company devices, as is often the case in professionally IT managed organizations.

A major shortcoming of "Centralized Storage" systems is that they require viewers to create an account, which may cost the Originator extra platform fees, and do not provide protection against unwanted downloads, screen captures, or otherwise printing the stored documents. Furthermore, the Originator may need to ensure that the particular rights-controlled files are in a separate isolated directory from other documents to ensure the intended viewers do not have access to view unintended documents. This is particularly difficult where the intended viewer is viewing documents from multiple different senders, is associated with multiple different projects, and/or the Originator is managing multiple types of documents intended for a variety of viewer types. It also requires senders to keep track of who has access to what folder and with which documents, which can be particularly troublesome since an error may cause sensitive information to be accessible by unauthorized viewers.

There are generally two type of Originators: (a) holders of electronic files and documents to distribute such files securely to third parties, while keeping the original holder in full control over each document, its content, and access rights; even after sending, or (b) systems that build electronic files and documents to distribute such files securely to third parties (such as output management systems or software, document assembly software, and CRM document and form builder extensions), while keeping the original holder or the administrator of the document assembly system in full control over each document, its content, and access rights; even after sending.

One skilled in the art would consider standard web browsers such as Chrome, Edge, Firefox, Safari and others that have javascript enabled native to business workstation computing devices, such as desktop and laptop computers, and some mobile devices.

With general document sharing by businesspeople, or systems that generate documents, the standard file type for sharing has become PDF. PDF files after transmission are static representations of the document that do not provide for dynamic controls of the document content for the Originator, nor provide for a feedback loop or interactivity between receiver and Originator.

For years, businesspeople converted documents into PDF files, mainly with intention to signal that the document was in final form, not intended to be editable, with its formatting and content integrity preserved. For many, PDF file meant un-editable, protected, and formal. With today's ubiquity of PDF editing and other software tools, PDF files are no longer perceived to a protected un-editable format.

There is therefore a need for a secure file format that provides reliable form, while regaining the secure attributes traditionally associated with PDF files.

For example, with special PDF editing tools, a document owner may be able add some protections, such as limiting copying, printing, or requiring a password to access the file. However, a savvy computer user may often overcome these safeguards with no traceability or indication to the document owner, and therefore the document owner remains unaware if and when the content has been shared in an unauthorized or unintended manner. There is a need to resolve this shortcoming by providing content protections, as well as allowing Originators to control access to content after the send, kill or revoke content after the send regardless of restrictions enabled pre-send, and identify leakers with advanced share protections.

With PDF files the sender has no control over the file after the send. Accordingly, there is no recourse for recovering a document that is, for example, inadvertently sent to an unintended recipient, or was intentionally intercepted by a cybercriminal. Thus, there is need that if the document is misdirected or the Originator simply would like to end availability, the Originator can terminate access to the document at the click of a button.

PDF files are inactive, and do not allow for engagement after sending. Thus, there is a need to allow the Originator to glean or request read-time insights related to viewing, sharing, praise or dislike for document content.

Further, there is an entire industry of Enterprise Output Management (EOM) software and systems that deal with the organization, formatting, management and distribution of data that is created by enterprise applications like banking information systems, insurance information systems, ERP (enterprise resource planning systems), CRM (customer relationship management), document builders, document scanning, document electronic faxing, retail systems and many others. These systems construct a file from inputs and often prepare that file as a document compiled in PDF format for storage in a web system, transmission by API, or transmission by email. In the early days of output management systems, these files would become images of a document in a TIFF format which is a static format. Then PDF files became the standard, which includes the ability to apply some basic static controls to the document, such as password protection. The next era of Output Management is to provide a new file type, which bring about an era of interactive and dynamic controls being applied to the output format document.

In the early days of PDF files, to create a PDF file as an Originator to share, one would need a PDF file editor software program; and to view a PDF file one would need to download a PDF reader or viewer companion software. Through the early 2000's, the PDF reader software became nearly ubiquitous. However, today, very few people have PDF reader companion software as the basics to view a PDF (the basics of the traditional PDF reader companion software) are now built into all web browsers in "lighter" versions called PDF viewers.

The ability to click on a PDF file and have it automatically open in any web browser "PDF viewer" has made it so most today do not know the difference between PDF readers and PDF viewers. There is a difference of course-PDF readers are powerful software programs that can run scripts that can be written into PDF files. PDF viewers (browser native PDF file opens) will not run the scripts. A formidable challenge to those looking to employ advanced protections with scripts that run within PDF files is that often a file Originator does not know whether the intended file viewer will have PDF reader software or PDF viewer browser capabilities when they open the PDF file. Without this knowledge, the Originator does not know if the special scripts will properly run. For this reason, relying on PDF reader companion software to be present at the recipient is fraught with user confusion and frustration by Originator and recipient.

Some document rights management companies have developed their own proprietary reader companion software. Today, however, the challenge to make any one of these ubiquitous is more daunting that ever before as (a) install rights for recipients are generally restricted in most mid-to-large company business environments due to the risk of malware installs, and (b) there is not any one rights management companion software that is dominant or is expected to become the norm. While Microsoft offers its Azure Rights Management system, even this has its challenges as recipient of Microsoft rights protected files must have certain premium software licenses. A control of this kind may be available to IT staff if looking to control rights inside their own company, but certainly not feasible if looking to share rights controlled documents to those external to their IT control.

Some document rights management systems do attempt to provide for distribution of content with editing capabilities, shared editing, and/or editor tracking and access rights. This functionality is native in systems like Microsoft Teams, Microsoft SharePoint, Microsoft Outlook.com, Microsoft Office365 Online, Google Drive and Docs, Box, Dropbox, among others. These services provide for online storage of documents with the ability to share a link to a document to intended parties who log-in (assuming they are granted appropriate access) to collaborate on edits to a particular document. Generally speaking, if one can edit the content, they could copy the content into another medium and the Originator loses control.

Another way of controlling distribution of documents while preserving the editable form of the documents is to send the documents attached to encrypted email. Document can be shared in editable, red-line trackable form (such as a Microsoft Word document attached to an encrypted email with Track Changes feature enabled). Likewise, this is a secure method of content collaboration. In both of the above scenarios, editing often comes with the ability to copy, paste, view multiple pages simultaneously, download, and other features suitable for editorial collaboration.

While these content collaboration systems are certainly useful for when one is working on a team and each team member has granted login access or open editing access, they are not designed to preserve and protect the document content. Instead, these are secure content collaboration platforms.

With the evolution of today's e-communications, users are adapting to instantly interactive messaging protocols and are accustomed to managing the view of multiple threads of conversations; collaborative platforms for internal or connected teams. Email is becoming a more formal channel, for transmitting messages and documents to external parties, namely those unconnected via shared logins to a common platform.

Additional challenges shared by the three rights management systems is that there are no meaningful ways to "kill" a document plus its forensic record of existence after sending or sharing. There is also no meaningful way to track a version to a leaker who has permitted an unauthorized reproduction of the document. Furthermore, these systems struggle to ensure content of the original document is not accessible via viewing encryption/decryption keys that could be gleaned if transmitted in other manners within HTML files.

It is therefore an object of the invention to provide an electronic document system that overcomes the aforementioned shortcomings in the art. This object is achieved as by the various embodiments of this disclosure ("RDocs"), which overcomes these challenges by use of its inventive RPD file construct in which the security and controls that the Originator prescribes are built into the RPD file itself. The RPD file may then be displayed to readers as an .HTML file, which may be openable in any browser or .html file viewer.

SUMMARY OF THE INVENTION

It is an object of the invention to provide a system and a method allowing an originator of an electronic document to retain control over this document even after sharing said document with one or more recipients.

It is another object of the invention to provide a variety of different controls instructions associated with a shared electronic document, limiting for example which recipients can view the document, how often it can be viewed by certain recipients, and over which time span the document may be viewed. The latter may also include a kill function, terminating the viewability of the document by all recipients in its entirety at any given point time.

According to a first aspect of the invention, an electronic document transformation and sharing system is provided, allowing a document originator control over an electronic document shared by the document originator with at least one recipient, said system comprising: an input device configured to receive an original electronic document and document-specific controls instructions pertaining to said original electronic document, and to assign a transaction ID pertaining to said original electronic document; a web server; a database on said web server, storing transaction IDs with correlating controls instructions pertaining to said original electronic document; a document transformation module that is in data transmission connection with said input device that receives the original electronic document and database that stores the transaction ID's with correlating controls instructions for said original electronic document, the document transformation module transforming said original electronic document to an encrypted transformation document encompassing said transaction ID and controls information; a data transmission subsystem transmitting the transformation document per email to at the least one receiver or making the encrypted transformation document retrievable by the originator or by the at least one recipient per API from a second data storage; and an electronic transformation document viewer that is a standard web browser or has at least the capabilities of a standard web browser for viewing said encrypted transformation document by the at least one recipient, said document viewer being in data transmission connection with said database and making said encrypted transformation document visible after transaction ID verification between the encrypted transformation document and the transaction ID stored in said database if said document-specific controls instructions correlating to said transaction ID are met.

According to a second aspect of the invention, a method of electronic document transformation and sharing is provided, allowing a document originator control over an electronic document shared by the document originator with at least one recipient, said method comprising: the originator submitting an electronic document with controls instructions into a database on a server; the server generating an encrypted transformation document with the transaction ID and the controls instructions embedded; transmitting the encrypted transformation document to the recipient; upon attempting to open the encrypted transformation document, the encrypted transformation document initiating a request for authorization; and the server determining whether the recipient is an authorized reader, and if not, decline the authorization, and if yes, authorizing the upload of the encrypted transformation document, decrypting the encrypted transformation document and sending the decrypted transformation document to an electronic transformation document viewer to be viewed by the recipient.

According to a third aspect of the invention, an electronic document transformation system allowing a document originator control over a shared electronic document is provided, said system comprising: an input device configured to receive an original electronic document and document-specific controls instructions pertaining to said original electronic document, and to assign a transaction ID pertaining to said original electronic document; a database, storing transaction IDs with correlating controls instructions pertaining to said original electronic document; a document transformation module that is in data transmission connection with said input device that receives the original electronic document and database that stores the transaction ID's with correlating controls instructions for said original electronic document, the document transformation module transforming said original electronic document to an encrypted transformation document encompassing said transaction ID and controls information; a data transmission subsystem transmitting the encrypted transformation document to the originator or to a designated system by the originator, or making the encrypted transformation document retrievable by the at least one recipient per API from a second data storage; and an electronic transformation document viewer that has is or at least the capabilities of a standard web browser for viewing said encrypted transformation document, said document viewer being in data transmission connection with said database and making said encrypted transformation document visible after transaction ID verification between the encrypted transformation document and the transaction ID stored in said database if said document-specific controls instructions correlating said transaction ID are met.

According to a 4th aspect of the invention, an electronic document transformation and sharing system is provided, allowing a document originator control over an electronic document shared by the document originator with at least one recipient, said system comprising: an input device configured to receive an original electronic document; a web server; a database on said web server, storing an identifier for each document received; a data transmission subsystem transmitting by email an information link identifying the document to at least one recipient; at the recipient: an electronic transformation document viewer that has at least the capabilities of a standard web browser for viewing images in standard formats; an input device configured to receive requests to view identified documents; a system which responds to requests to view a document by returning singularly an image of each page of the original document with each request to view a page of the document.

DETAILED DESCRIPTION OF THE INVENTION

Within this field, the disclosure relates to a system generally that empowers (a) holders of electronic files and documents to distribute such files securely to third parties, while keeping the original holder ("Originator") in full control over each document, its content, and access rights; even after sending, or (b) systems that build electronic files and documents to distribute such files securely to third parties (such as output management systems or software), while keeping the original holder or the Originator administrator ("Originator") in full control over each document, its content, and access rights; even after sending.

The disclosure further provides a means for intended readers to access document content without any special companion software that is not native to most common business computing devices, namely providing a means for intended readers to access document content within their native browser. Importantly, the various embodiments of this disclosure do not require any intended reader to have any special companion software or browser settings that are not typical, nor have any plug-ins, or reader accounts.

The disclosure further provides a means for Originators to revoke access temporarily or permanently kill a document entirely even after delivery, including all traces of the transaction.

The disclosure further provides a means for Originators to deliver these documents direct to each recipient—there is no storage of documents by a third-party after the send before retrieve by the recipient.

The disclosure further provides a means for Originators to receive real-time insights as to who is viewing what, when and where; with tallies of reader sentiment or feedback related to the content, for example, likes and dislikes—with such insights automatically gathered upon the receiver viewing files or providing other indications from within the document itself.

The functionality prescribed by the various embodiments of this disclosure is a system that includes the system server, input and output devices, and an encrypted transformation document created from the original electronic document such as a PDF file, in the following also named RPD file, generally provides a means for:

1. Intended readers to access document content without any special companion software that is not native to business workstation computing devices, namely providing a means for intended readers to access document content within their native web browser. Importantly, the various embodiments of this disclosure do not require any intended reader to have any special companion software or browser settings that are not typical, nor have any plug-ins, or reader accounts;

2. Originators to revoke access temporarily, or to permanently kill a document entirely, even after delivery, including all traces of the transaction;

3. Originators to deliver these documents directly to each recipient, without any third-party storage of documents in the period between the send and the retrieval by the recipient; and 4. Originators to receive real-time insights as to who is viewing what, when and where; and tallies of reader sentiment or feedback related to the content, for example, likes and dislikes. These insights may be automatically gathered upon the receiver viewing files or providing other indications from within the document itself.

Some exemplary applications where an Originator may reap advantages from distributing content as RPD files instead of as PDF files include:

Publishers of subscription research reports and financial tip newsletters who send their content as PDF files risk readers sharing the fee-based content with others without a licensed. If sent as an RPD file, sharing can truly be disabled, controlled, and tracked.

Corporate executives and company secretaries share non-public corporate, board or shareholder reports as PDF files or via encrypted email with PDF files attached. Once sent, they risk readers sharing the business-sensitive content with others. If sent as an RPD file, sharing can truly be disabled, restricted to viewers within the Originator designated company, voted on in-the-document, killed after usefulness, and view-time tracked.

Transactional closing purchase agreement documents, which often include funds transfer information, are often shared as PDF files. As an added layer of protection for mitigating wire fraud risk through wire instructions intercepted and modified to cause mis-wires, documents sent related to financial closings or transfers could be sent as RPD files with viewing restricted only to viewers within an IP-geo-location and within the domain of the intended party.

Invoices are often sent individually or from Output Management systems are sent as PDF files attached to email and are susceptible to forgery by those monitoring emailed invoice transmissions. Invoices could be generated to only be viewable within the organization of the intended payee (by IP range of the intended viewer, IP-geo-location and/or domain).

Agreement sent for final review related to transactions that are highly sensitive, are often sent as PDF files or via encrypted email, or sometimes as scans of a print out of a PDF for perceived extra authenticity protection. RPD files are preferred to ensure no undetected edits could be applied, and to ensure privacy of the information tied to a user with the sensitive information viewable only by the designated viewer.

RDocs, and its RPD files, are configured for rights protected controlled document distribution. In other words, RPD files are intended to be used for final distribution of content that is not intended to be edited by readers, or which the Originator intends not to make editable. However, unlike PDF files where edits made using a PDF editor may be undetectable, RPD files are specifically designed to preclude undetectable edits, even if users have PDF editors or use photoshop or other programs.

The Originator's RPD file send/creation history pane becomes the Originator's control panel for each document. In addition to its functionality for managing the access and protections for the RPD file, it also for the Originator to view insights or feedback related to each reader/viewer. The RPD "SideNote®" and "Doc Vote™" features within the RDocs™ service are designed to showcase how messages may be embedded inside documents and how likes, dislikes—or other interactive elements—can be built into documents with real-time feedback loops and real-time data analysis of insights presented to the Originator. RPD files makes it easy to build real-time document-centric interactivity into file sharing, email, or instant messaging platforms, wherein all platforms share a common format. Ultimately, pushing a message inside an HTML email wrapper may be similar to pushing a message inside an HTML file (an RPD file wrapped in the HTML wrapper). RPD files are packaged in HTML format so there is no need for any companion software; viewing access for readers is as ubiquitous as are web browsers. RPD files allow users to simply click to open an RPD file, and the file opens for viewing in any browser. Finally, the RPD in-document interactivity, brings document-centric email closer to the functionality of instant messaging interactive platforms.

In the above embodiments, the receiving of the encrypted package including the document from the viewer to the system server, the preparation of the document to display to the viewer, and the transmission of the document page to the viewer are further described below:

(A) Pre-Process to Create the Encrypted Package to Transmit

The original sent document pre-processed into a standard document format to speed future imaging processing plus the original sent control instructions and the transaction document ID generated at the time of pre-processing are encapsulated within the encrypted content received.

After the click to open the RPD at the viewer, (B) Prepare at the system server

Document ID and some metadata (may include recipient/reader email address based on control instructions) is passed from viewer to system server if document is (by originator rules) killed or expired, max authorized or remaining reads per reader, units available, or otherwise not authorized by location, etc. as determined from passed metadata and Doc ID lookup compared to controls in the database at the system, then system sends message to viewer to display message document not available.

if document is (by originator rules) alive or can be permitted to be viewed, then the system server sends signal to the viewer to transmit the document (encrypted document package that contains the document and full metadata of controls information and document ID) to the system server.

(C) Transmit Content to Viewer

At server upon receipt of the encrypted document package, encrypted document package is decrypted document is prepared based on the controls information, with preparation to at least include for a subset of pages, creating an image of each page delivering the image of the viewer requested page to view to the viewer (only that page)

holding the other imaged pages in memory until the viewer opts to view another page.

if the viewer opts to view a page that has not yet been put in image, then that requested page and pages surrounding are imaged that requested page is delivered.

At viewer, instructed by server not to cache images (not store in memory at viewer).

BRIEF DESCRIPTION OF THE DRAWINGS

The drawings accompanying in forming part of the specification are included to depict certain aspects of the disclosure. A clear impression of the various embodiments of the disclosure, and of the components and operation of systems provided within the disclosure, will be more readily apparent by referring to the exemplary, and therefore nonlimiting, embodiments illustrated in the drawings, wherein identical reference numerals designate the same components.

These diagrams are describing some embodiments of the various embodiments of this disclosure, those skilled in the art will understand that there are other embodiments and more details within each of these embodiments not depicted in these diagrams.

Detailed Description of the Preferred Embodiments

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Detailed descriptions of known computer software, hardware, operating platforms, and protocols are omitted so as not to unnecessarily obscure the disclosure in detail. Various substitutions, modifications, additions and/or rearrangements within the spirit and/or scope of the underlying inventive concept will become apparent to those skilled in the art from this disclosure.

Figure 1:
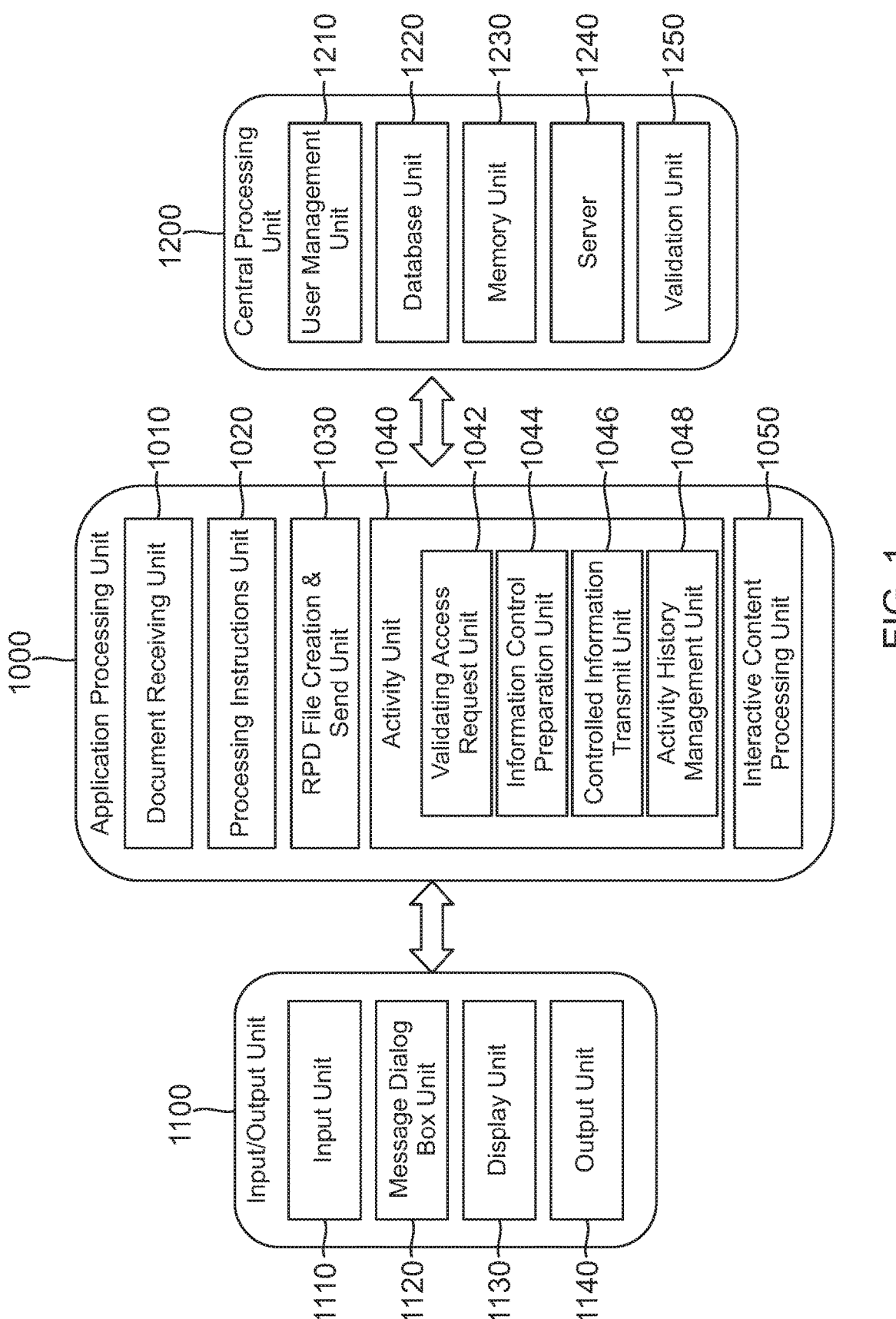
FIG. 1 is a schematic diagram of the components of a system for generating RPD files.

FIG. 1 is a schematic diagram of the components of a system for generating RPD files. The system comprises an Application Processing Unit 1000, an Input/Output Unit 1100, and a Central Processing Unit 1200. The Application Processing Unit 1000 comprises a Document Receiving Unit 1010, a Processing Instructions Unit 1020, a RPD File Creation & Send Unit 1030, an Activity Unit 1040, and an Interactive Content Processing Unit 1050. The Activity Unit 1040 includes various sub-units including a Validating Access Request Unit 1042, an Information Control Preparation Unit 1044, a Controlled Information Transmit Unit 1046, and an Activity History Management Unit 1048. The Input/Output Unit 1100 comprises an Input Unit 1110, a Message Dialog Box Unit 1120, a Display Unit 1130, and an Output Unit 1140. The Central Processing Unit 1200 comprises a User Management Unit 1210, a Database Unit 1220, a Memory Unit 1230, a Server 1240, and a Validation Unit 1250. Document Receiving Unit 1010 may be configured to receive the original document and any instructions corresponding to that document. Processing Instructions Unit 1020 may be configured to process the instructions received by the Document Receiving Unit 1010. RPD File Creation & Send Unit 1030 may be configured to create an RPD document using a creation process, apply controls instructions to the RPD, and transmit the RPD file by email or other means. Activity Unit 1040 may be configured to perform the functions of steps 41, 43, 44, and 46, relating to the collection and displaying of activity data, as well as validation functions. Interactive Content Processing Unit 1050 may be configured to process the interactive data (e.g. votes, feedback, engagement analytics).

Figure 13:
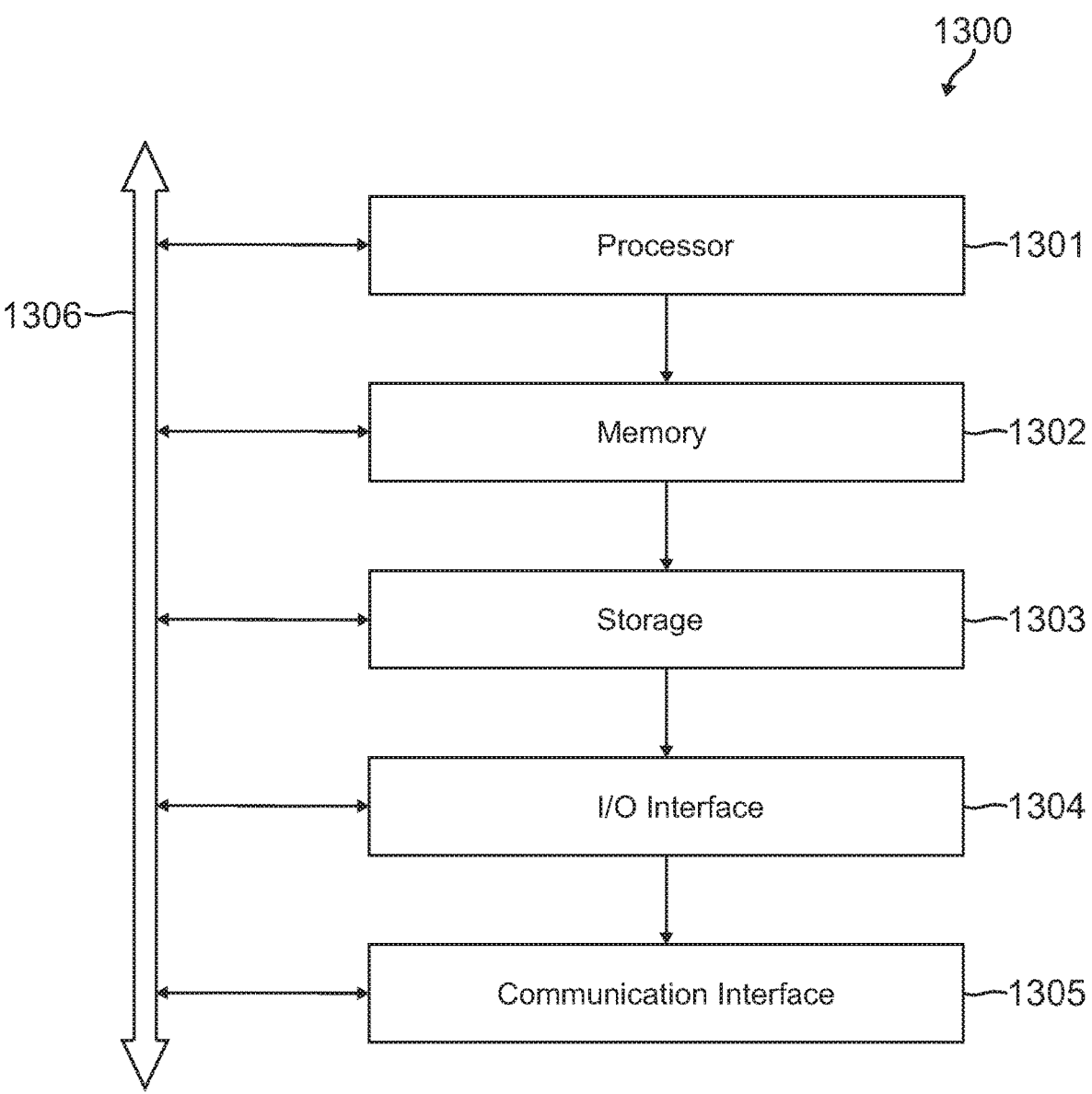
FIG. 13 is a schematic diagram of a computer or processing system that may be specifically modified by the various embodiments of the present disclosure.
Figure 14:
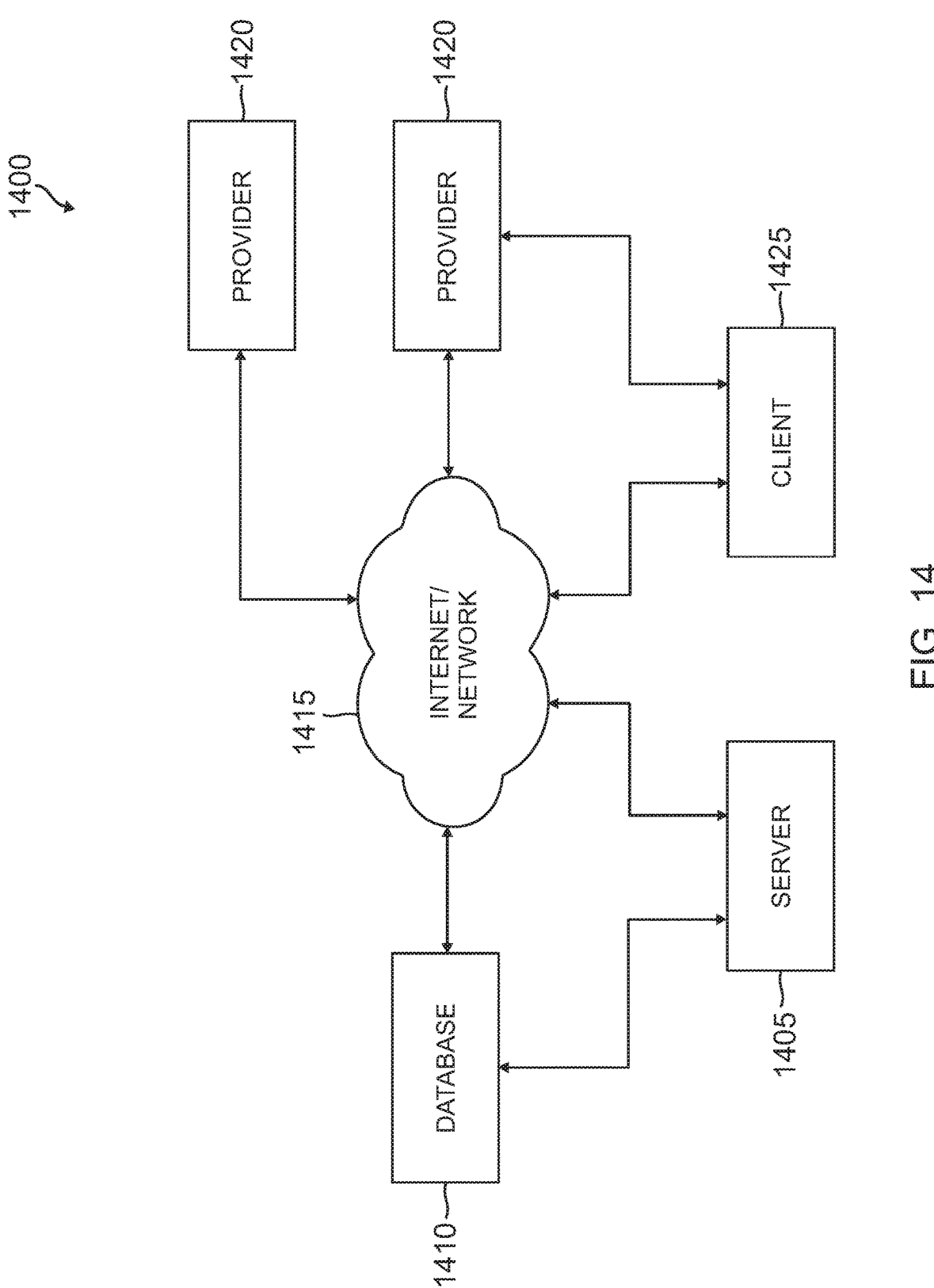
FIG. 14 is a schematic diagram of a network use in accordance with the various embodiments of the disclosure.

The Central Processing Unit 1200 relates to the elements of the computer system 1300 of FIG. 13 and the network of FIG. 14. User Management Unit 1210 may be configured to manage and control user accounts and activities relating to user access. The Database Unit 1220 may include one or more databases, for instance the Instructions Database 13, Activity Database 42, RPD File Database 18, and Session Activity Database 150. Memory Unit 1230 and Server 1240 may perform the functions of corresponding elements 1302 and 1405, as described regarding FIGS. 13 and 14. Validation Unit 1250 may be configured to perform functions relating to the validation of users, for instance the validation/authentication processes of FIG. 11.

Input/Output Unit 1100 performs a variety of functions described in the processes of FIGS. 2, 10, 11, and 12. The Input Unit 1110 may be configured to receive inputs into the system, for instance data transmitted to the system or entered via an interface. Message Dialog Box Unit 1120 may output dialog messages. For instance, the Expired Display Message of Steps 33 and 133, and the Deny Authorization Message of Steps 206 and 214. Display Unit 1130 may enable display of various interfaces described herein, including the Document Receiving Unit Interface 300, Updated Instructions Input Interface 400, Kill Selected Button 410, Activity Data Display Interface 500, Email Attachment Display Interface 600, Encrypted RPD File Viewer Interface 700, and Opened RPD File Viewer Interface 800. Output Unit 1140 may be configured to provide outputs from the system.

Figure 2:
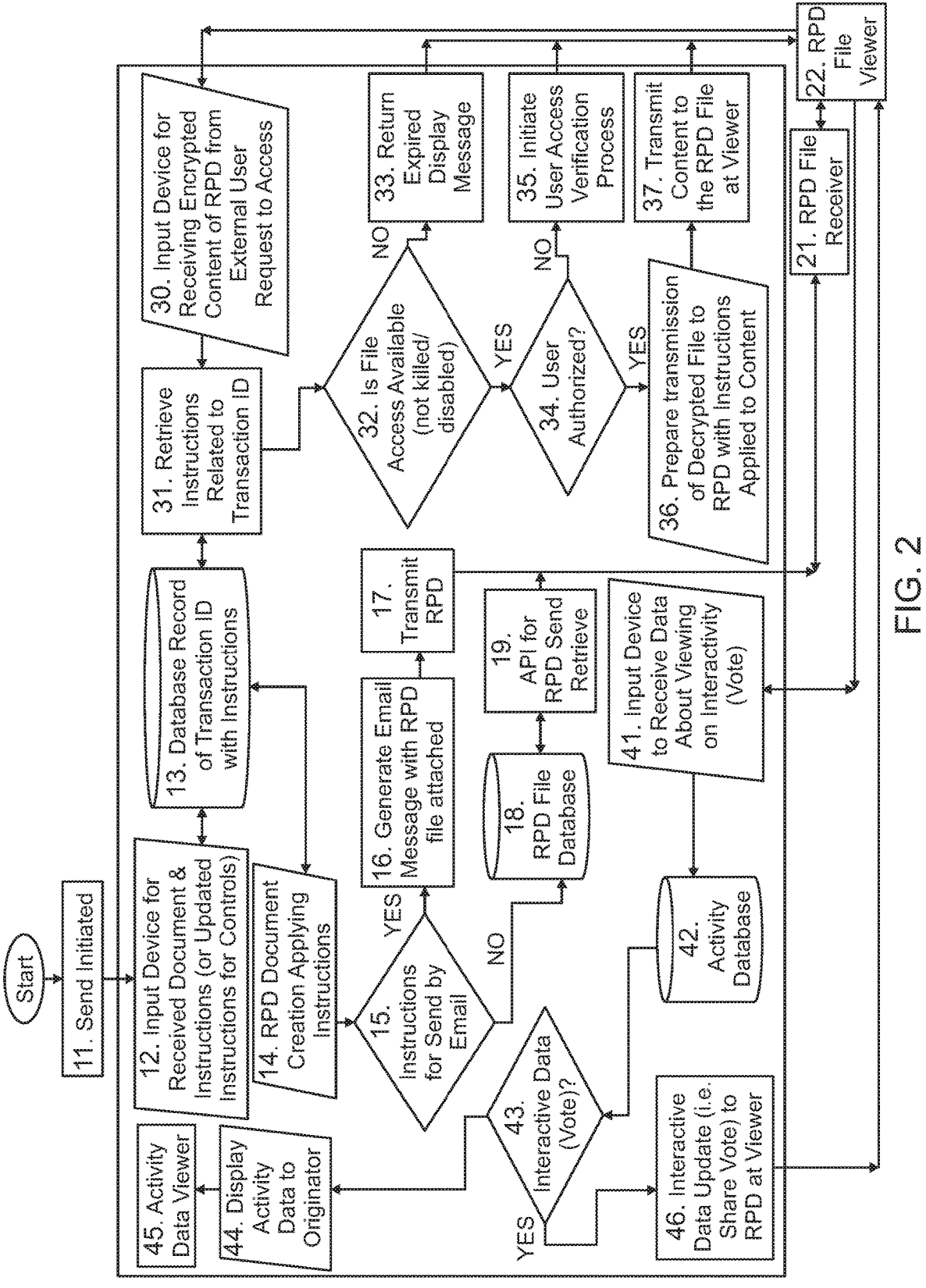
FIG. 2 is a flowchart of the functions of an RPD generation, controller and activity processing unit according to an embodiment of the present invention.

FIG. 2 is a flowchart of the functions of an RPD generation, controller, and activity processing unit according to an embodiment of the present invention. The system may be configured to generate an RPD file, transmit the file, authenticate and display file information, receive activity data, and return interactive data into the viewer's interface. In step 11, the sending of a file is initiated. The send can be initiated, for example, using the system's web sender interface, where a document is uploaded and controls instructions are added associated with the document. In another embodiment, the documents may be submitted via API along with data file with controls instructions. In another embodiment, documents may be submitted via API and a pre-set controls instructions would apply. In yet another embodiment, documents may be submitted or sent via SMTP email routing, or other methods, such as a sender sending an email with attachments, and that email routes outbound through a data leak prevention system or server. The server identifies that there are attachments, and separates those attachments from the email, and transforms those attachments into RPD files by submitting them via API to a creation server. The API returns the transformed files, which are then re-attached to the email, and the email continues its routing to the recipient with the newly transformed attachments from original formats to RPD files. The party sending the file may be referred to as the Originator. The control instructions to be applied to the file may be specified by the Originator through the Document Receiving Unit Interface 300.

In step 12, the Document Receiving Unit 1010 receives the document and any instructions corresponding to that document. As an alternative to controls instructions, instead there may be an indication to use pre-set controls. For instance, if no control instruction file is included, the system may be configured to apply the most recently used control instructions as a default. In addition to the original instructions, the system may additionally be configured to update the instructions, such that they differ from the original instructions. These instructions may be entered into the Updated Instructions Input Interface 400 shown in FIG. 4. For instance, the updated instructions could be to kill a certain file, which may be achieved by clicking the Kill Selected Button 410.

In step 13, a database generates a transaction ID record associated with the document and stores the controls instructions in the database associated with the transaction ID.

In step 14, the RPD File Creation & Send Unit 1030 creates a RPD document using a creation process, and applies the controls instructions to the RPD.

In step 15, the Processing Instructions Unit 1020 determines whether the control instructions include directions to send the file to recipient addresses via email. If the controls instructions include such instructions, then according to step 16, the RPD File Creation & Send Unit 1030 generates an email with the RPD file attached. Subsequently, in step 17 the RPD File Creation & Send Unit 1030 transmits the RPD file by email. Otherwise, if the control instructions do not include such instructions, according to step 18 the RPD file is stored in a database, and in step 19, an API transmit the RPD file to a third-party system, or for a third-party system to use webhooks or other methods of retrieving the RPD file. If access to a RPD file is restricted, when it is retrieved, the document includes an indicator as to which email address (es) access is restricted to.

In step 21, the RPD File Receiver receives the RPD file, for instance via email, or if retrieved by API, then inside a third-party system. If the RPD file is sent via email, it may display to the RPD File Receiver as the Email Attachment Display Interface 600.

In step 22, a viewer may access the RPD file. The viewer may, for example, be a human, or a third-party system accessing the file. The RPD File Viewer may view the Encrypted RPD File Viewer Interface 700 or Opened RPD File Viewer Interface 800, depending on the status of the restrictions/verification.

In step 30, when the RPD file is opened, an input device receives an encrypted content package transmitted from the RPD File Viewer back to the system. This package may include preliminary metadata for the system input device to evaluate to determine the status of the RPD file (whether disabled, expired, etc.) before accepting the encrypted content package that contains the original file data.

In step 31, based on the encrypted content package, the system accesses the database of step 13 and retrieves the database record containing the controls instructions associated with the Transaction ID.

In step 32, the system determines whether file access is available, as opposed to being killed or disabled. If the file related to the Transaction ID has been killed, disabled, time-expired, or no record exists, according to step 33, the Message Dialog Box Unit 1120 generates a Return Expired Display Message and displays the message in the view interface of the RPD file. Otherwise, the system proceeds to step 34, where the system verifies if the user accessing the RPD file at the viewer is an authorized user. If the user is not an authorized user, according to step 35, the system transmits an instruction to the Message Dialog Box Unit 1120 to display a message to the reader indicating that the document is not available. Otherwise, if the user is an authorized user, according to step 36, the system prepares transmission of a decrypted file to RPD with instructions applied to content. Subsequently, in step 37, the system transmits content to the RPD File Viewer, such that the content of the RPD file may be displayed, for instance via the Opened RPD File Viewer Interface 800.

In step 41, the input device of the system may receive activity data related to the viewing from the RPD file at the activity input device. The activity data may comprise one or more data parameters associated with viewing and interactivity, such as the number of times viewed, minutes viewed, votes, likes, etc. In step 42, the Activity Database may record the received input activity associated with the Transaction ID.

In step 43 the system determines whether the input data includes Interactive Data, and if so, in step 46, the system captures updated interactive data and transmits it to the RPD File Viewer. The interactive data could, for instance, be a vote.

In step 44, all RPD file activity data is displayed via the Activity Data Display Interface 500.

Figure 3:
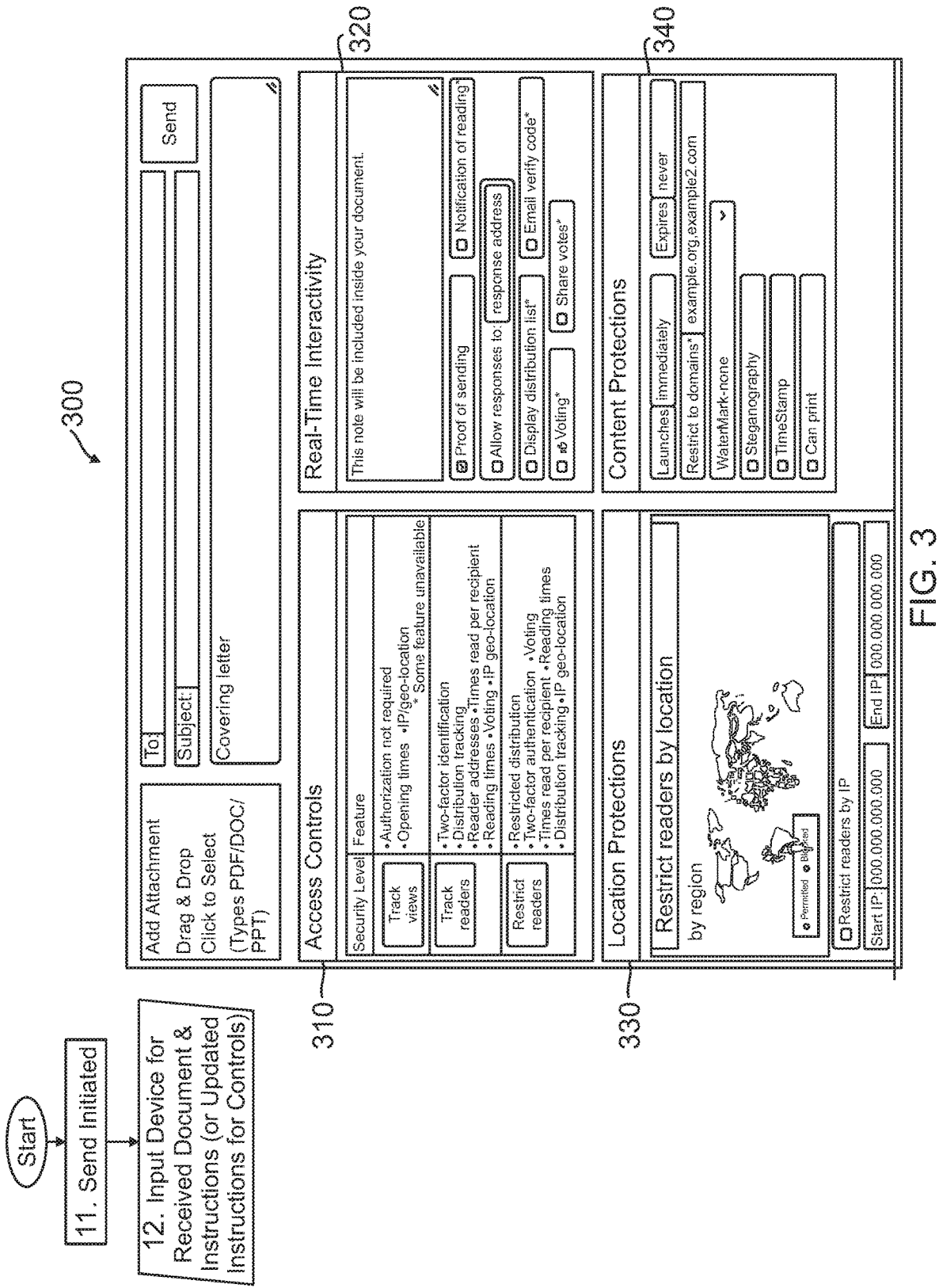
FIG. 3 is an exemplary Document Receiving Unit Interface shown with a corresponding partial schematic of the flow chart of FIG. 2, according to an embodiment of the present invention.

In step 45, the Originator views the activity data via the Activity Data Display Interface 500. FIG. 3 shows an exemplary Document Receiving Unit Interface 300 associated with the Document Receiving Unit 1010. In the context of the flowchart of FIG. 2, this interface is associated with entering controls instructions according to steps 11 and 12. The Document Receiving Unit Interface 300 comprises an Access Controls Module 310, a Real-Time Interactivity Module 320, a Location Protections Module 330, and a Content Protections Module 340.

The Access Controls Module 310 enables a user to select a desired level of security for the document, including Level 1 Security: "Track Views", Level 2 Security: "Track Readers", and Level 3 Security: "Restrict Readers", wherein each security level activates certain features for the monitoring and/or exclusion of readers. The features are discussed in greater detail regarding FIG. 15.

The Real-Time Interactivity Module 320 allows a user to select features associated with readers' interactions with the document, for example proof of sending, notification of reading, and voting functionalities. The document may track who views what, when and where, and for how long. Moreover, the present invention enables notes to be appended into the document, and may tally viewers votes, likes, dislikes, and feedback in real time. For instance, feedback may be returned in real-time as a viewer reads the document. This feedback may be in the form of "likes" and/or dislikes, which may be tabulated by the system and provide insights into the reactions of document viewers. This voting functionality may also be tied to text of a question related to the document with the option for viewers to like, dislike, and/or provide other responses. The feedback may be displayed to an Originator in real-time by means of a user interface. Exemplary features through which a Document Originators may opt to interact with their readers with real-time interactivity inside the document include: (i) short message sharing, (ii) short message responses, (iii) voting (likes and dislikes) in documents, (iv) record of agreement to content from indications in the content itself, (v) real-time vote tally and aggregation, (vi) real-time vote sharing with all voters, and (vii) more interaction and data flow from reader to Originator.

The Location Protections Module 330 allows a user to restrict access to the document based on geographical location, wherein an Originator sending an RPD attachment may restrict the geography where it can be viewed, or define the internet locations where it can be accessed, for example by reader domain, IP range, or geographic region. In one embodiment of the invention, the Document Originators can opt to restrict viewing to certain geographic locations by clicking regions on a digital interface of a world map, or limit to specific Internet locations based on a set start and end IP range (such as only within a country or within an Originator corporate or client corporate network).

The Content Protections Module 340 allows a user to add a variety of additional protective measures to a file. Furthermore, Originators may choose to rights protect document content by scheduling document initial viewing availability time and final viewing expiration time, or may apply additional advanced content protections to the document, including: (i) Restrict viewing within a web domain or set of domains, such as requiring a viewer to have a certain corporate email address, (ii) Watermarking the document with confidential or other visible marks, (iii) Timestamping the original document with a uniform time seal, (iv) Print restricting the original document, (v) Generating authorized reader identity-marking to track a photo-capturing leaker, and (vi) Killing a document and all of its traces. The Content Protections Module 340 may include an option to enable steganographic measures, which may be uniquely applied to an RPD to add authorized reader visual identity tags such as the authorized reader's email address that traverse each viewed page. Readers visually see that if they were to share a snapshot of any one page or part of a page, they would be at risk of the leak being easily traced to them. In this way, an RPD may provide steganography as a court-admissible proof of who authorized any unauthorized snapshot sharing. The purpose of this feature is to identify leakers. Document originators can opt to add steganographic or overt dynamic watermarks that are in-motion floating and uniquely identifiable to each authorized recipient. In the overt mode, readers visually see that if they were to share a snapshot of any one page or part of a page, they would be at risk of the leak being easily traced back to them. As a result, RDocs™ not only discourages unauthorized sharing (in the overt mode), but also can further provide court-admissible proof of who shared any unauthorized snapshot of a document (in steganographic or overt mode).

Through the Content Protections Module 340 of the Document Receiving Unit Interface 300, an Originator may also make a document self-destruct—also known as making the file inaccessible to any viewer or cryptographically locking it for all viewers-based on a variety of parameters such as on a timer or after a number of views, or my restrict sharing via print, copy, forward or photo.

Figure 4:
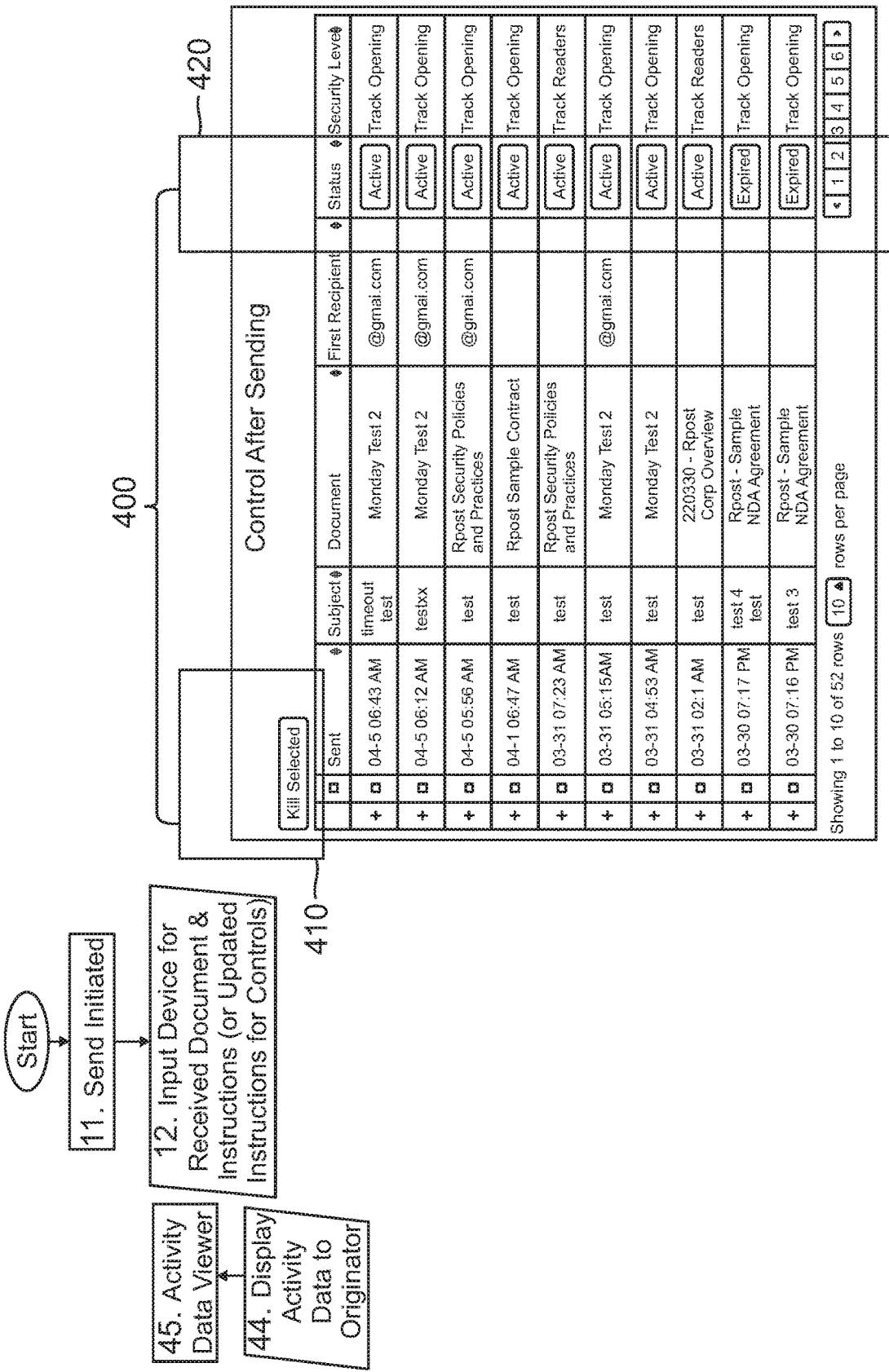
FIG. 4 is an exemplary Updated Instructions Input Interface shown with a corresponding partial schematic of the flowchart of FIG. 2, according to an embodiment of the present invention.

FIG. 4 shows an exemplary Updated Instructions Input Interface 400 in which an Originator may input updated instructions. In the context of the flowchart of FIG. 2, this interface is associated with updating control instructions according to step 12, as well as the displaying of activity data on the Activity Data Viewer according to steps 44 and 45. In one aspect of the invention, an Originator may control or kill content after sending an RPD file, for instance if sensitive content is inadvertently sent to the wrong recipient.

The Originator may kill the document, temporarily disable viewing, even after transmittal to a recipient, thereby allowing the Originator to retain total control of the document. The Originator can click to: (i) expire a document at will at a click of a button and toggle to disable and then re-enable viewing access at any time; and (ii) entirely kill a document, thereby killing all traces of its sending, distribution, tracking, and content, at any time even after the send. The updated instructions input may be integrated in the Activity Data Viewer, such that an originator may view in the Status Column 420 the current statuses of various documents contemporaneously to selecting which documents to kill. Once the desired selections have been made, the originator may kill the selected items by clicking the Kill Selected Button 410.

Figure 5:
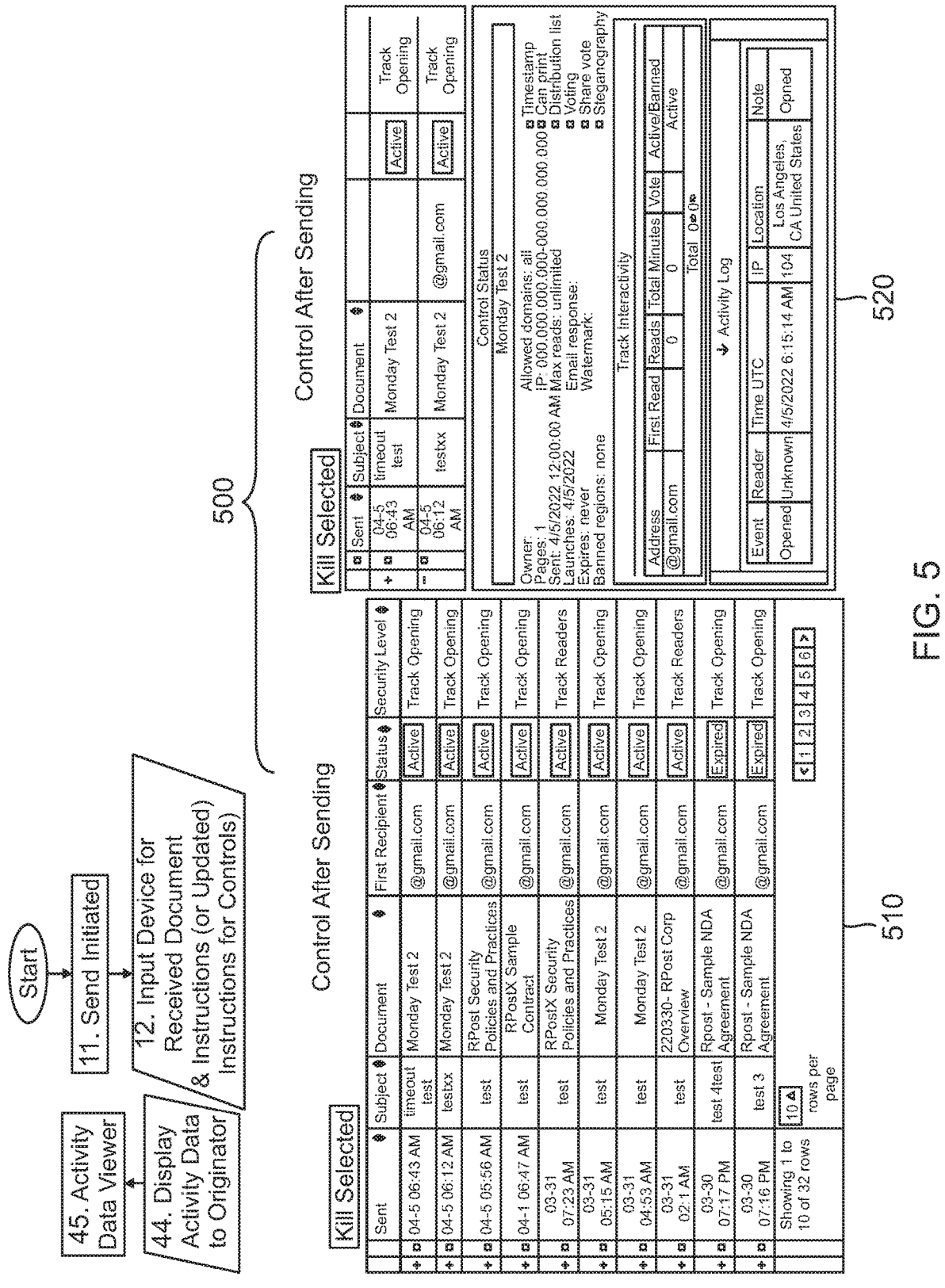
FIG. 5 is an exemplary Activity Data Display Interface shown with a corresponding partial schematic of the flowchart of FIG. 2, according to an embodiment of the present invention.

FIG. 5 shows an exemplary embodiment of an Activity Data Display Interface 500 in which activity data may be displayed to originator according to step 44 in the flowchart of FIG. 2. The Activity Data Display Interface 500 may comprise an Activity Data Table 510 and an Activity Data Profile 520. The Activity Data Table 510 may, for each record entry, include tabulated data with various columns including, for example, the date of sending, subject line, document name, email address of first recipient, status, and security level. Each record entry in the Activity Data Table 510 may be selected to display its Activity Data Profile 520, which may feature more detailed information about Track Interactivity and Activity Log. The Track Interactivity may keep a log of interaction data, such as the time of first read, the number of reads, minutes spent interacting with a document, votes, and status of the user. The Activity Log may keep a log of activity data, such as activity type, reader identity (if known), time and date of activity, IP address, and location.

Figure 6:
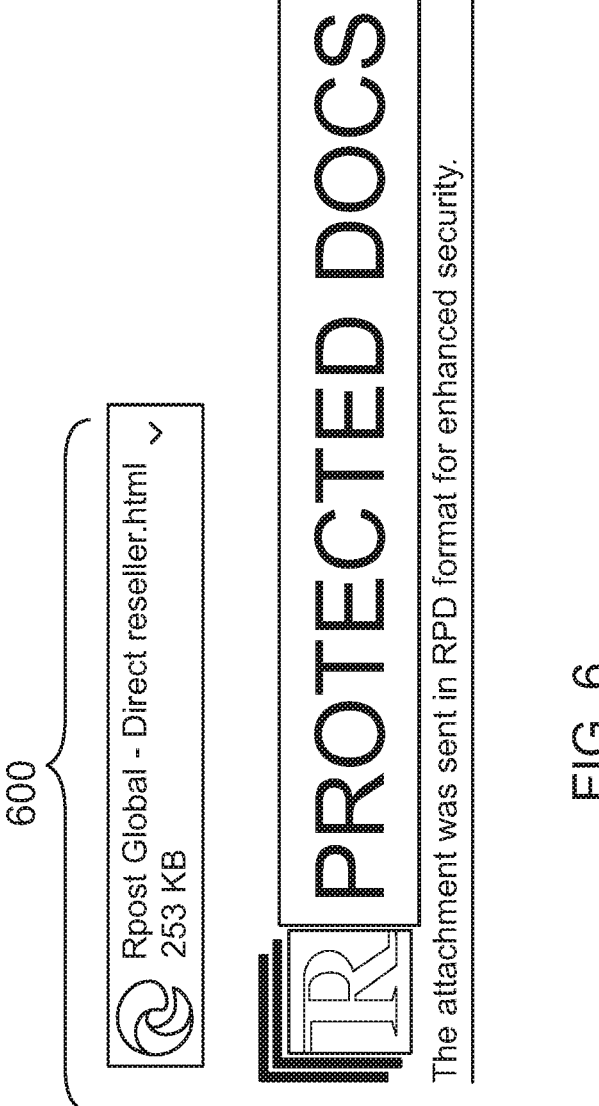
FIG. 6 is an exemplary Email Attachment Display Interface shown with a corresponding partial schematic of the flowchart of FIG. 2, according to an embodiment of the present invention.

FIG. 6 shows an exemplary embodiment of an Email Attachment Display Interface 600 demonstrating how an HTML format RPD file may be displayed at the RPD File Receiver as an email attachment. This file may be opened to display, for example, one of: Encrypted RPD File Viewer Interface 700 or the Opened RPD File Viewer Interface 800, depending on the access status.

Figure 7:
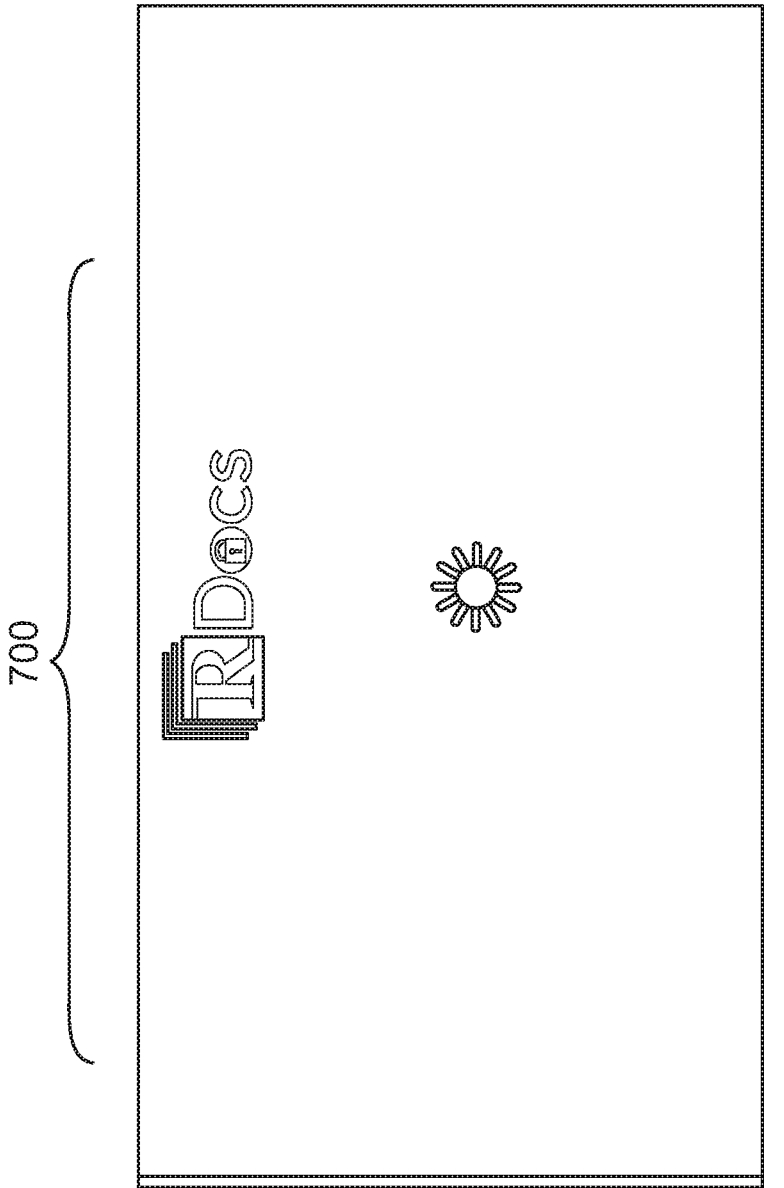
FIG. 7 is an exemplary Encrypted RPD File Viewer Interface shown with a corresponding partial schematic of the flowchart of FIG. 2, according to an embodiment of the present invention.
Figure 7:
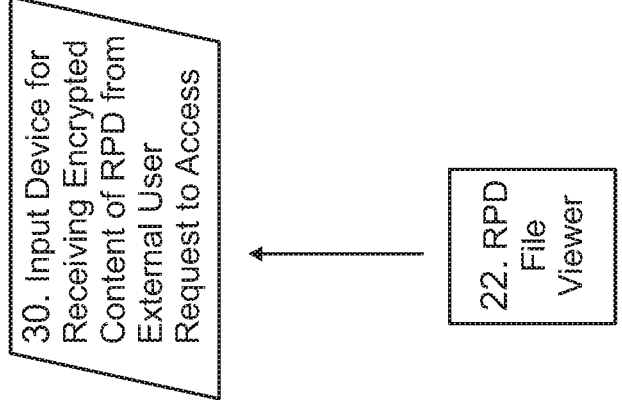

FIG. 7 shows an Encrypted RPD File Viewer Interface 700 corresponding to steps 22 and 30 of the flowchart in FIG. 2. The Encrypted RPD File Viewer Interface 700 may be displayed to a RPD File Viewer accessing the document in a web browser while the server retrieves records for an encrypted RPD file before access to the document is granted.

Figure 8:
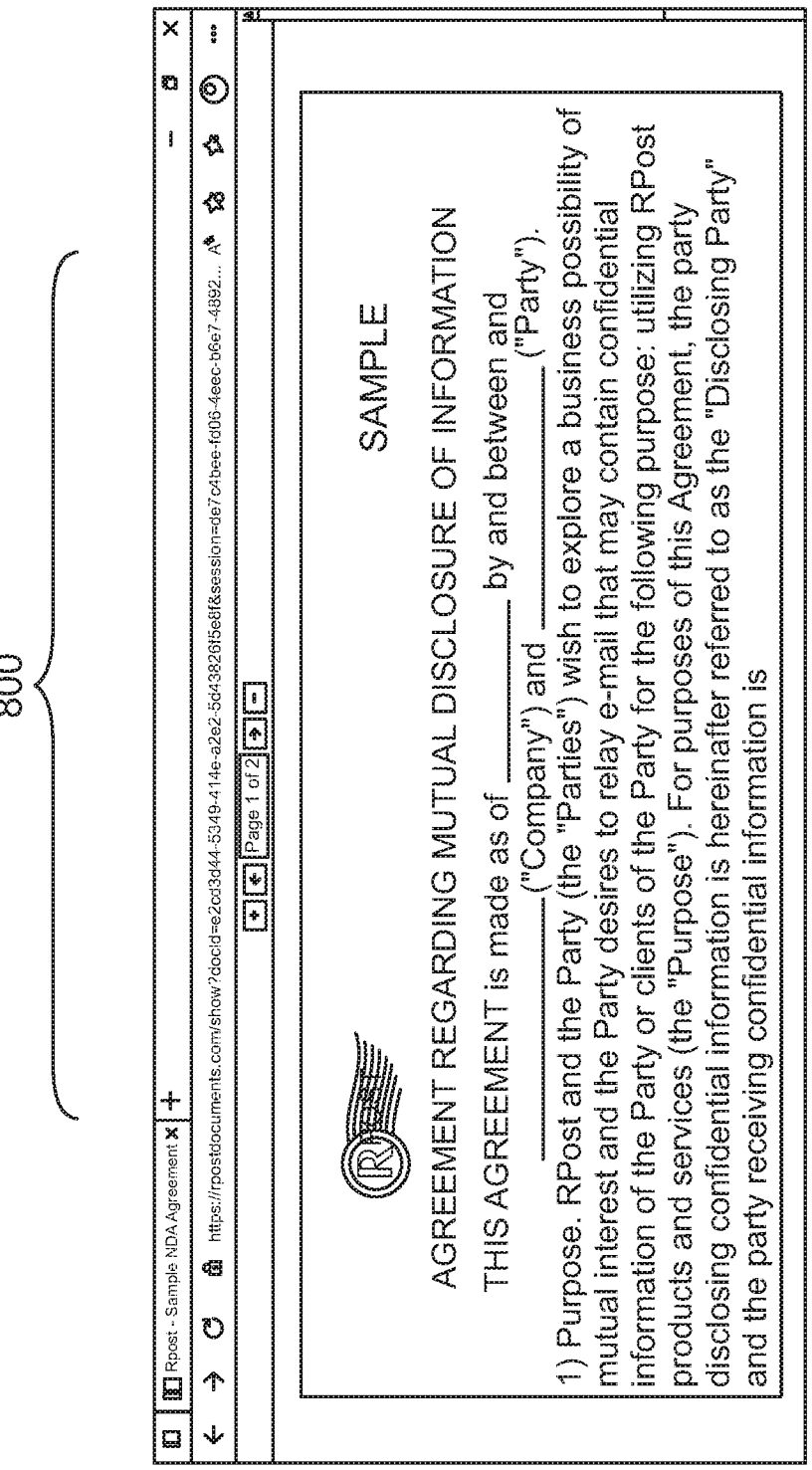
FIG. 8 is an exemplary Opened RPD File Viewer Interface showing a view of a document in a RPD file that has been opened in a web browser, shown with a corresponding partial schematic of the flowchart of FIG. 2, according to an embodiment of the present invention.

FIG. 8 shows an Opened RPD File Viewer Interface 800, namely a view of a document in a RPD file that has been opened in a web browser. The Opened RPD File Viewer Interface 800 corresponds to instances where access to the RPD file has been granted, for example when a successful authentication determination has been made. In the context of the RPD File Viewer, the Opened RPD File Viewer Interface 800 represents a contrast to the Encrypted RPD File Viewer Interface 700, in that it shows before and after access to the file has been granted.

Figure 9:
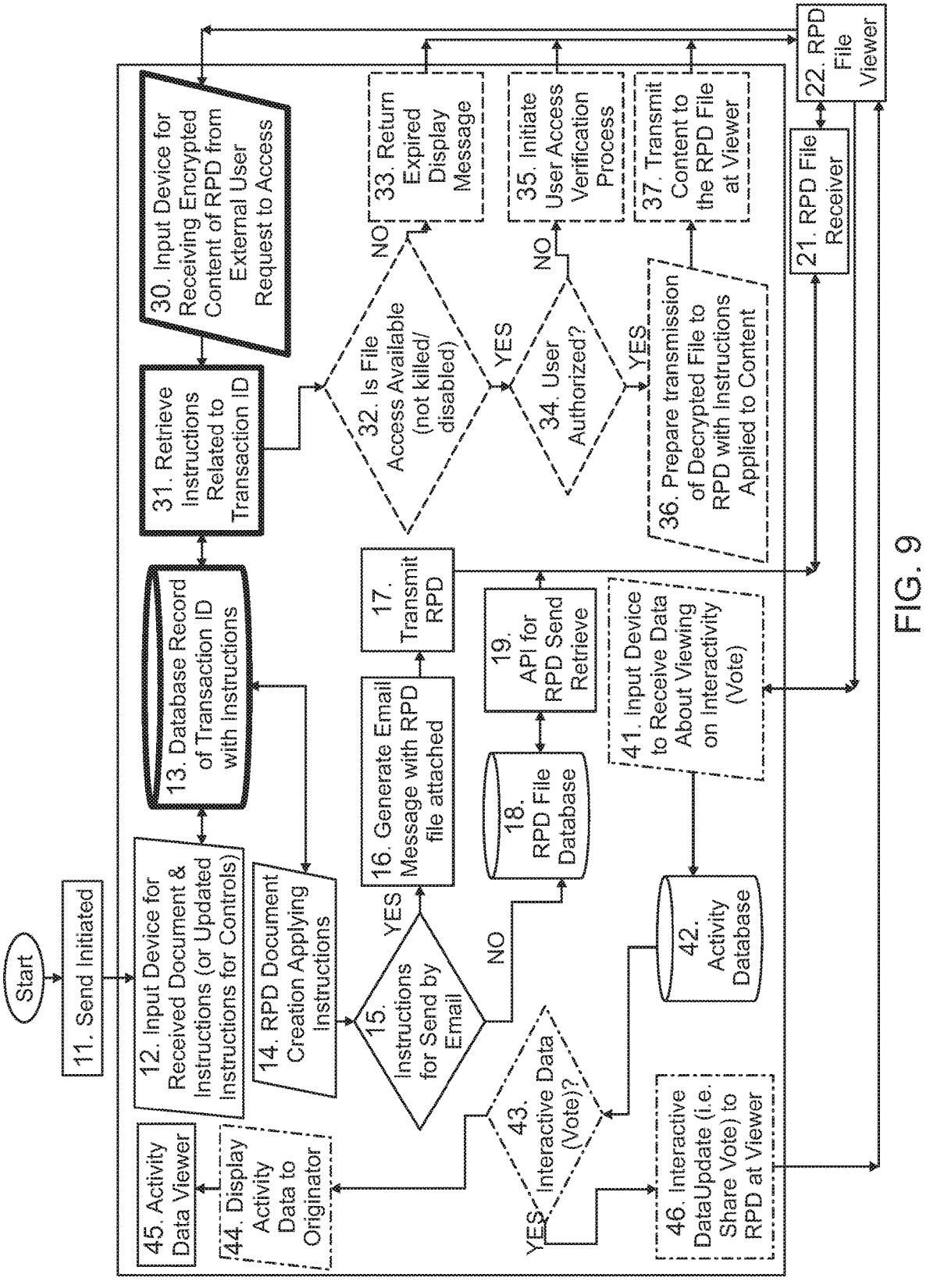
FIG. 9 is the flowchart of FIG. 2, modified to identify groupings of the related steps.

FIG. 9 is a modified flowchart of FIG. 2, wherein certain steps are grouped together to show their related function. The Transaction ID Database Group, denoted by thickened borders, comprises related steps 13, 30, and 31, which together form the process of taking an external user's request for access, accessing the database to retrieve a record containing the controls instructions associated with the Transaction ID to enable the execution of an authorization process. The Access and Authorization Group, denoted by dashed borders, comprises steps 32-37, where an analysis is conducted based on the controls instructions contained in the database record. The Activity Processing Group, denoted by dot-dash borders, comprises steps 41, 43, 44, and 46, which together perform the function of recording and displaying activity data. These functions may be performed by the Activity Unit 1040 of the Application Processing Unit 1000.

Figure 10:
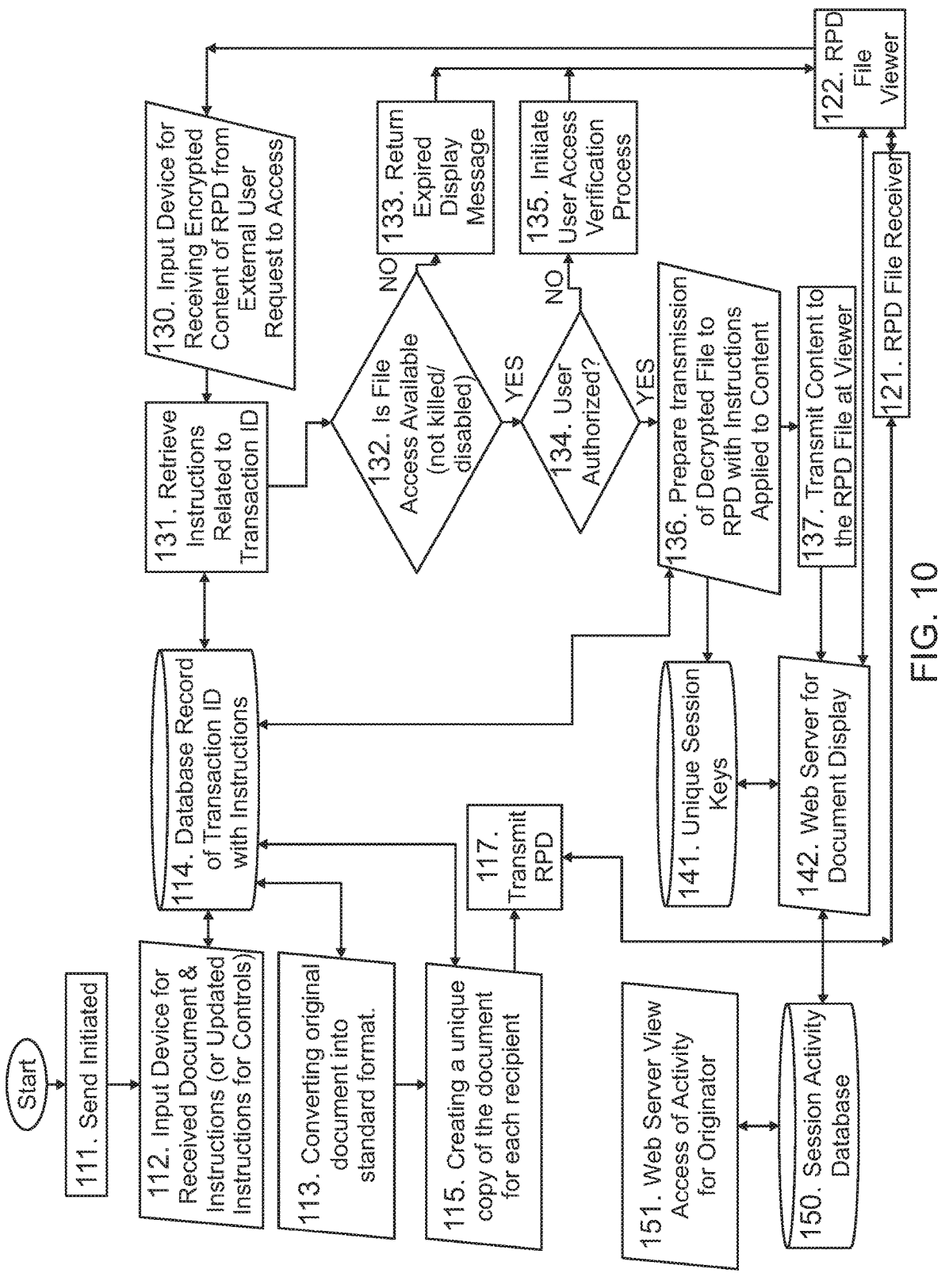
FIG. 10 is a flowchart of the functions of an RPD generation, control and transmission system according to an embodiment of the present invention.

FIG. 10 is a flowchart of the functions of an RPD generation, control and transmission system according to an embodiment of the present invention. It describes the system that operates on a server programmed to receive files from an Originator, receive instructions on what content controls, security, or in-document interactivity to apply to the file, programmatically transform the original file into an RPD file, and make a new RPD file, wherein the RPD file may be retrieved from the server or transmitted from the server to a recipient.

In step 111, the sending of a file is initiated. The send can be initiated, for example, using the system's web sender interface, where a document is uploaded and controls instructions are added associated with the document. In another embodiment, the documents may be submitted via API along with data file with controls instructions. In another embodiment, documents may be submitted via API and a pre-set controls instructions would apply. In yet another embodiment, documents may be submitted via SMTP email routing, or other methods, such as a sender sending an email with attachments, and that email routes outbound through a data leak prevention system or server. The server identifies that there are attachments, and separates those attachments from the email, and transforms those attachments into RPD files by submitting them via API to a creation server. The API returns the transformed files, which are then re-attached to the email, and the email continues its routing to the recipient with the newly transformed attachments from original formats to RPD files. The party sending the file may be referred to as the Originator. The control instructions to be applied to the file may be specified by the Originator through the Document Receiving Unit Interface 300.

In step 112, the Document Receiving Unit 1010 receives the document and any instructions corresponding to that document. As an alternative to controls instructions, instead there may be an indication to use pre-set controls. For instance, if no control instruction file is included, the system may be configured to apply the most recently used control instructions as a default. In addition to the original instructions, the system may additionally be configured to update the instructions, such that they differ from the original instructions. These instructions may be entered in the Updated Instructions Input Interface 400.

In step 113, the document is converted into a standard format.

In step 114, a database record is created, wherein the database record records (i) the various parameters controlling the Originator's selected features and restrictions, as specified by the Originator in the Document Receiving Unit Interface 300, that will control access to the document and the features it will display, (ii) the address of each intended recipient of the document, (iii) a unique identifier for the document, and (iv) a unique identifier for each recipient of the document.

In step 115, a unique copy of the document is created for each recipient of the document. This step may encompass one or more underlying/related items, including: (i) Creating an .HTML document including scripts to control the functions of the RPD and its user interface, (ii) including in the .HTML document the received original document in its standard format and a unique identifier associated with the recipient, (iii) applying watermarks and displays to the document, as specified by the Originator in step 112, for instance via the Document Receiving Unit 1010 or the Document Receiving Unit Interface 300, (iv) encrypting the document using a randomly generated key that is unique to each instance of the document, (v) recording in the database the encryption key associated with the recipient, (vi) encoding the encrypted file in an HTML compatible format, (vii) embedding a copy of the encrypted file in the .HTML document, and (viii) if the document settings require authentication, creating a verification code unique to each recipient and recording this in the database record associated with the recipient.

In step 117, a copy of RPD file that displays as an .HTML document is transmitted to the intended RPD file receiver, and is received by RPD file receiver in step 121. The RPD file receiver may have the RPD document displayed on the Email Attachment Display Interface 600, as shown in FIG. 6. If the document requires authentication, a copy of the verification code may separately be transmitted to the recipient.

In step 122, the RPD file, namely the .HTML document with its contents and functions as prescribed above, is opened in the recipient's browser. When this occurs, according to step 130, the document transmits its unique identifier to the server. The "document" is the RPD file that is displayed at the recipient as an .html file. Then, in step 131, the server retrieves the records associated with this instance of the original document. During this process, the RPD File Viewer may display the Encrypted RPD File Viewer Interface 700, as shown in FIG. 7.

In step 132, the server determines whether or not the original document is currently available. If the original document is not available, for example if the Originator has expired the document, disabled it, killed it, or it is timed out, according to step 133, the server transmits an instruction to the document to display a message in the document (displaying in the HTML view of the document in the browser at the recipient) to the recipient indicating the document is not available. Alternatively, if file access is determined to be available, the system proceeds to step 134, where the server attempts to determine the geographical location of the IP address of the document's transmission. If it is determined that the location violates any geographical restrictions governing the document, according to step 133, the server transmits an instruction to the document to display a message to the reader indicating that the document is not available.

In step 135, the system initiates an access verification process, which begins with the server determining what form of authentication may be required for the document. If the documents require authentication, the server transmits a signal to the document, causing the document to prompt the recipient to enter the recipient's email address and verification code, which are then then transmitted to the server. Subsequently, the server determines whether the recipient's verification code is valid, and whether the user is currently permitted to read the document. For example, this analysis may consider whether or not the email address associated with the reader is within a domain that has been restricted by the Originator, which could be specified through the Content Protections Module 340 of the Document Receiving Unit Interface 400.

If the recipient is authenticated and reading would not violate the access restraints requested by the Originator, the system proceeds to step 136, where the server generates a unique session key, records the unique session key in a database, and transmits the unique session key to the document.

In step 137, upon receiving a session key, the document uploads to the server: (i) the session key, and (ii) the encrypted file content embedded in the document.

In step 142, upon receiving the encrypted file and the session key, the server uses the unique encryption key associated with the document to decrypt the file, and stores the plaintext version of the file in temporary storage identified by the session key. Upon receipt of an acknowledgment from the server that the upload has been successful, the document redirects the recipient's browser to a web page server, including the session key as a parameter. At the web server, the server retrieves the stored plaintext file from memory. To retain control of the document, the server does not download a copy of the plaintext file. Instead, each page of the plaintext file (i.e. a decrypted version of the original document) is separately converted to an image file and transmitted to the document such that it may be displayed on the Opened RPD File Viewer Interface 800. Each page is presented as an image to the recipient on the web page.

A new page image is transmitted for display as the recipient pages through the document. The server records the time and length of the session in a Session Activity Database as a database record associated with the document and the recipient. The server deletes the temporarily stored decrypted file when the recipient ends the session, for example by closing the web page.

In step 151, the document activity and interactivity may be displayed to the Originator on the Activity Data Display Interface 500 or other report, thereby providing a web view of the Session Activity Database 150 via webserver access.

Figure 11:
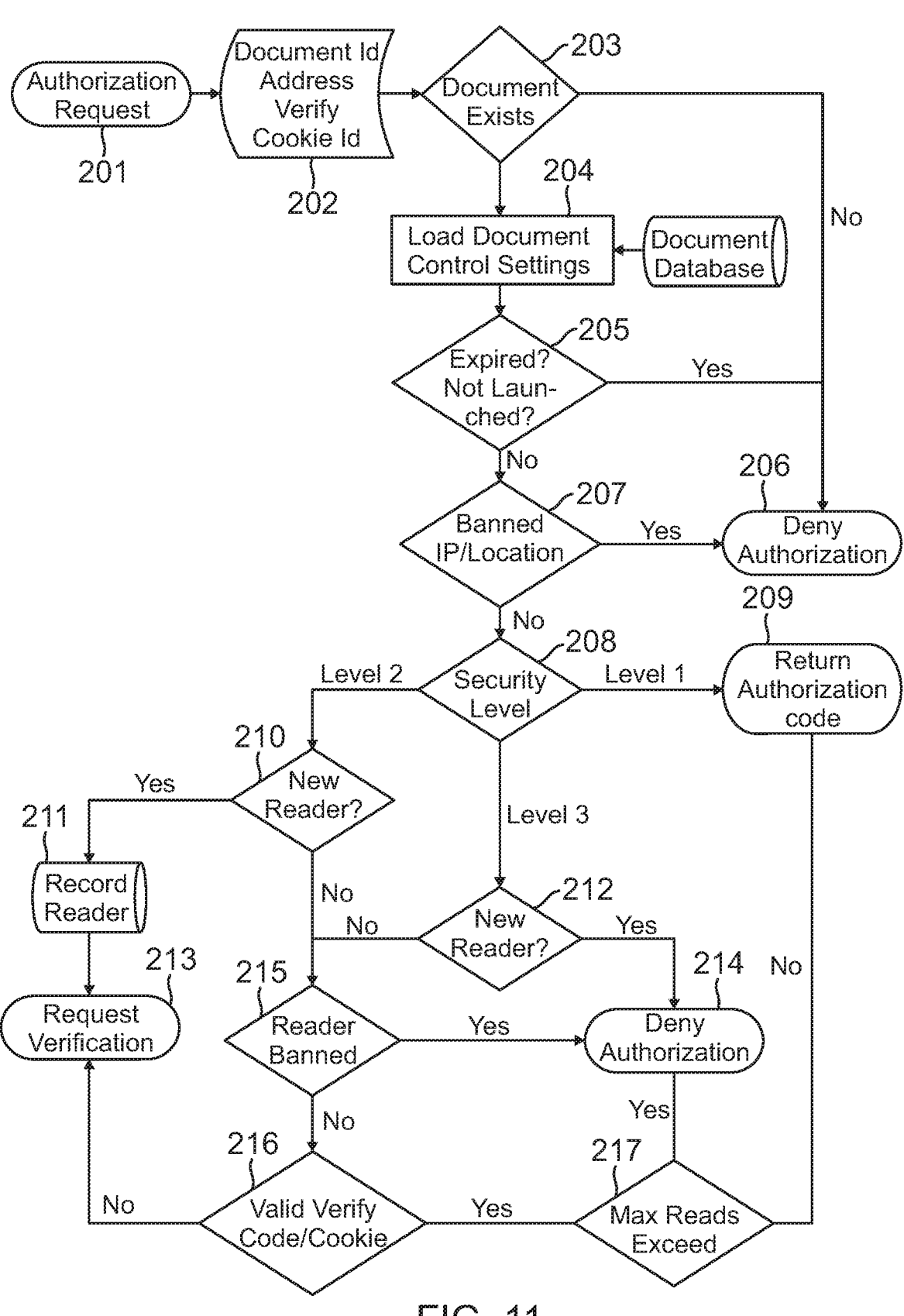
FIG. 11 is a flowchart of the system's authentication procedure when an RPD HTML document is attempted to be opened in a recipient's browser.

FIG. 11 is a flowchart of the system's authentication procedure when an RPD HTML document is attempted to be opened in the recipient's browser:

In step 201, the RPD HTML document displays an authorization request, and in step 202, sends the document ID and address, and verifies the cookie ID.

In step 203, the system determines whether the document exists by referencing a Document Database to determine whether the Document Database contains a record of the document ID. If the Document Database does not contain a record of the document ID, the process concludes at step 206, where the system denies authorization and displays a corresponding message inside the HTML document.

If the Document Database does contain a record of the document ID, in step 204 the control settings of the document are loaded from the Document Database, and the process proceeds to step 205, where the system determines whether the document is expired or not permitted to display/ launch. If the document is expired or not permitted to display/launch, the process concludes at step 206, where the system denies authorization and displays a corresponding message inside the HTML document.

If the document is permitted to display/launch and it is not expired, in step 207, the system determines whether access to the document has been banned for that user, for example on the basis of the IP address, geolocation, or other pertinent control parameter.

If access has been banned, the process concludes at step 206, where the system denies authorization and displays a corresponding message inside the HTML document.

If access has not been banned, the process proceeds to step 208, where the system verifies the access security level. There are three tiers of Security Levels, namely Level 1

Figure 15:
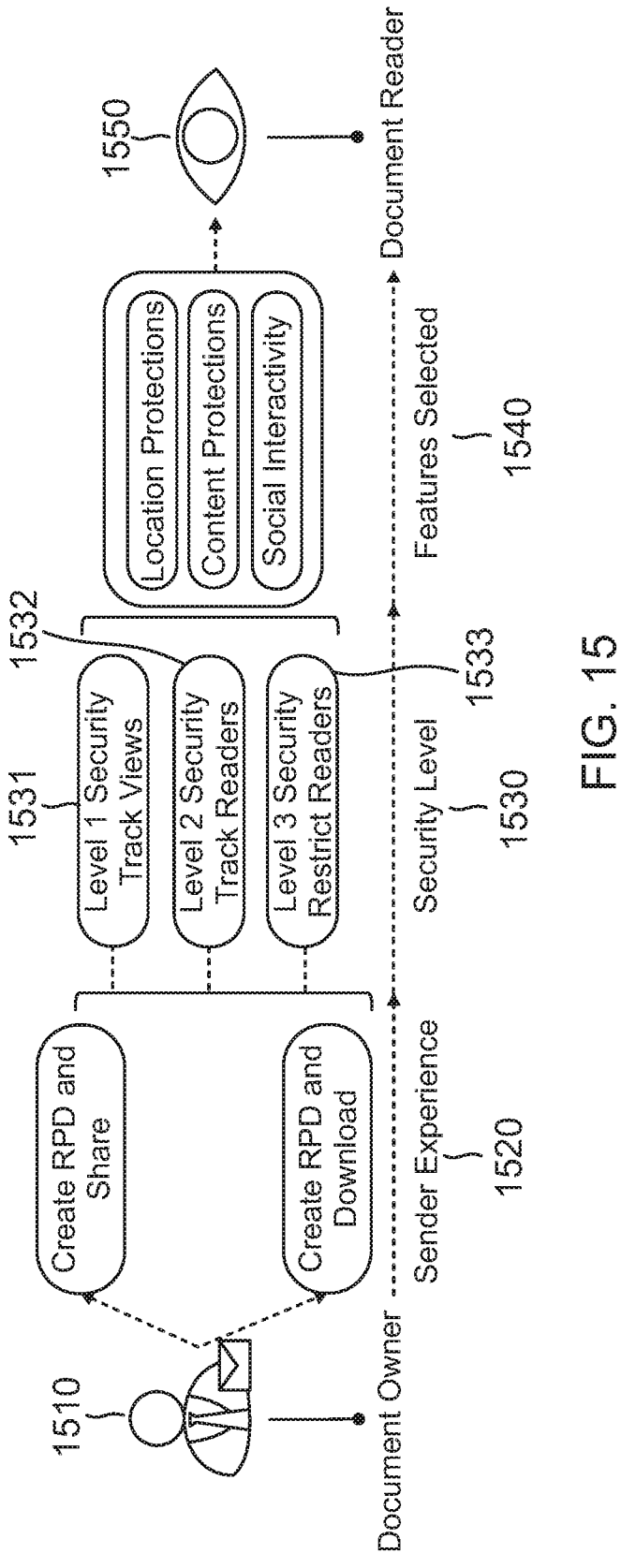
FIG. 15 is a simplified flowchart outlining the RPD creation and feature selection process according to an embodiment of the present invention.
Figure 16:
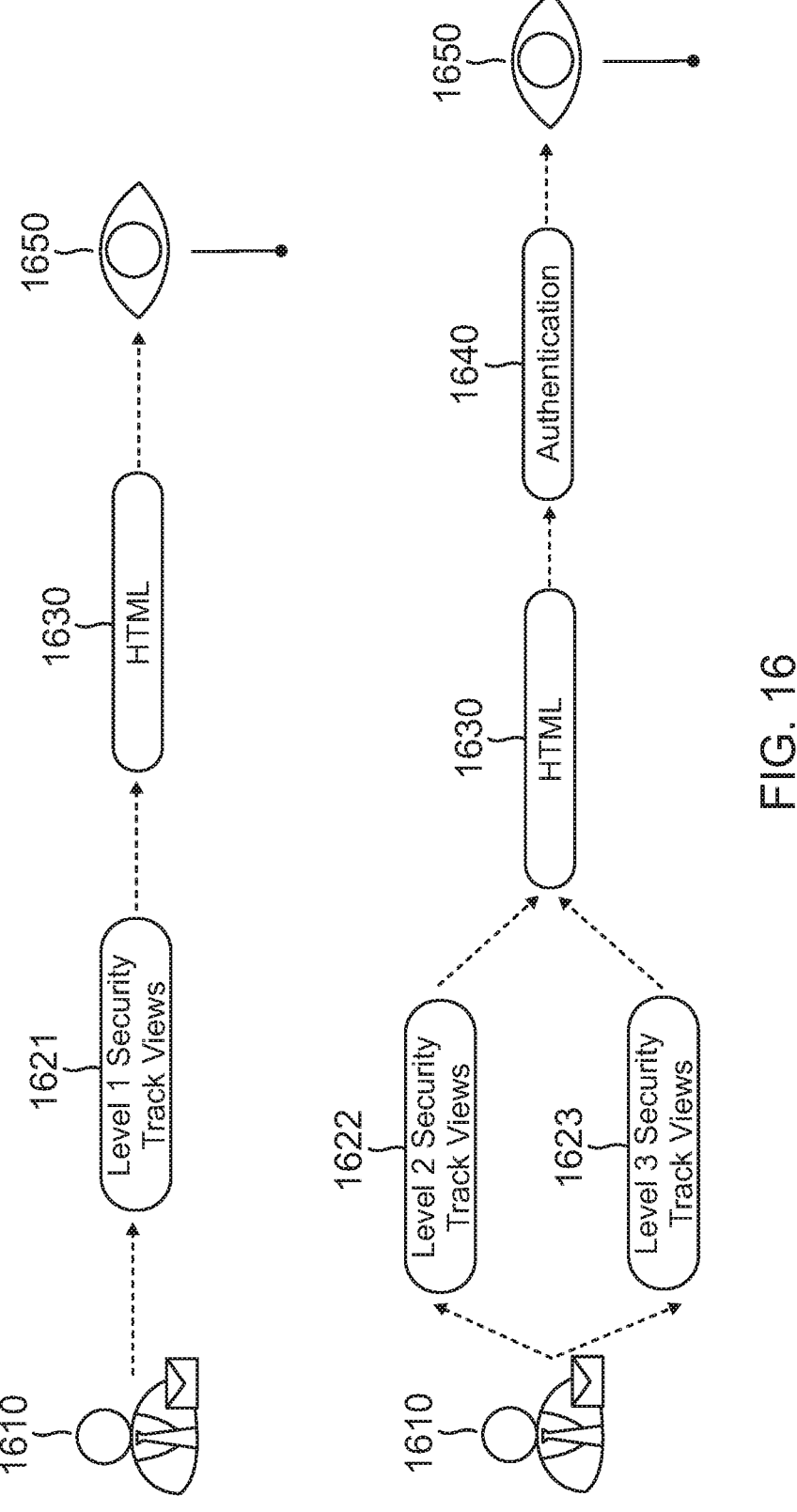
FIG. 16 is a simplified flowchart outlining the RPD transmittal and authentication process according to an embodiment of the present invention.
Figure 17:
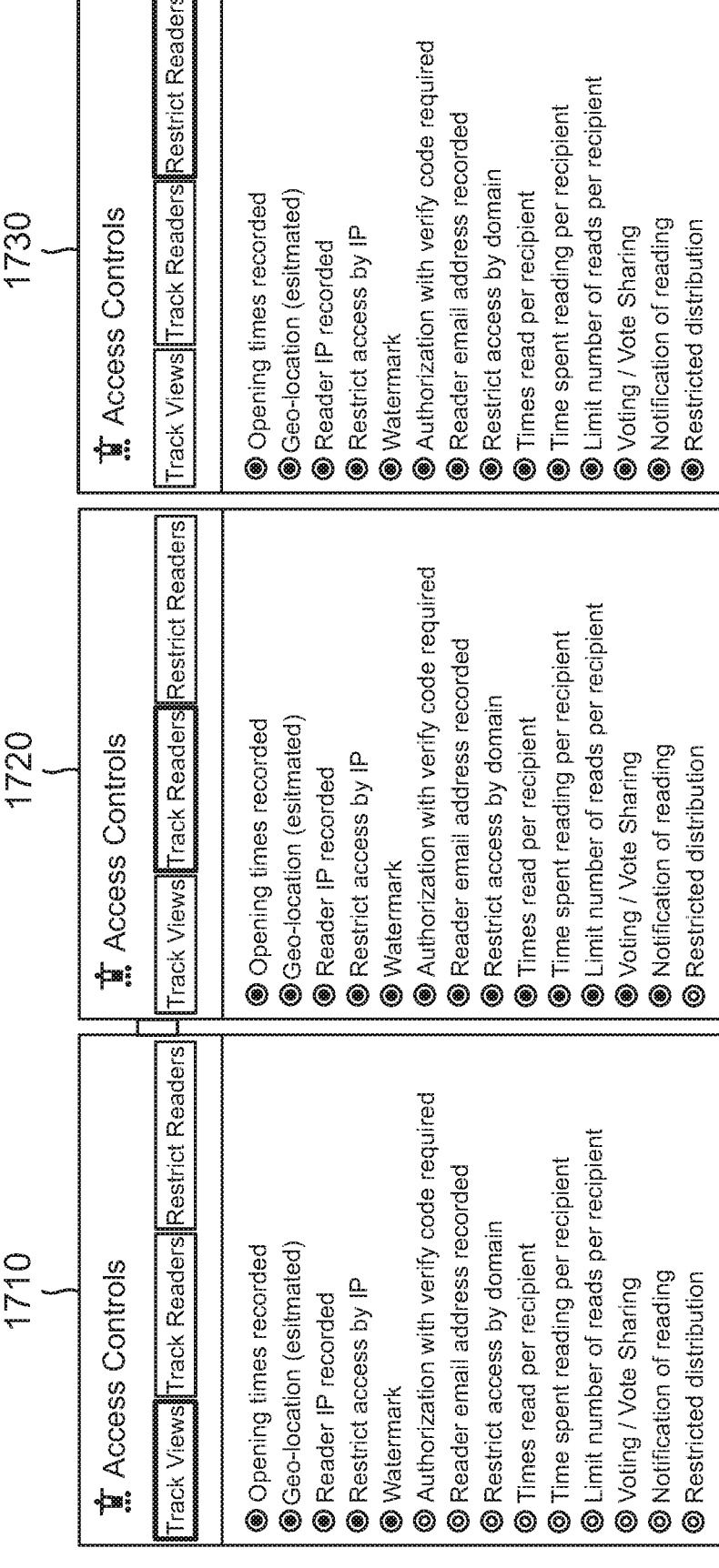
FIG. 17 shows a comparison of features menus for respective security levels according to an embodiment of the present invention.

Security 1531, Level 2 Security 1532, and Level 3 Security 1533, as explained further regarding FIGS. 15-17.

If it is Level 1 Security, the process concludes at step 209, where the system returns the authentication code to the server, indicating that it is permissible to display/launch the document, thereby granting access to the reader.

If it is Level 2 Security, the process proceeds to step 210, where the system verifies whether the reader is a new reader. If the reader is a new reader, the process proceeds to step 211, wherein the Record Reader records the reader with an authentication process, and then in step 213, requests access to display/launch the document.

Alternatively, if the reader is not a new reader, the process proceeds to step 215, where the system determines whether the reader is banned. If access has been banned, the process concludes at step 214, where the system denies authorization and displays a corresponding message inside the HTML document. If the reader is not banned, the process proceeds to step 216, where the system verifies the code.

If the verification code is invalid, the process concludes at step 213, where the system requests access to display/launch the document. If the verification code is valid, the process proceeds to step 217, where the system verifies whether a maximum reads limit has been exceeded, if applicable.

If a maximum reads limit has been exceeded, the process concludes at step 214, where the system denies authorization and displays a corresponding message inside the HTML document.

If no maximum reads limit has been exceeded, the process concludes at step 209 where the system returns the authentication code to the server, indicating that it is permissible to display/launch the document, thereby granting access to the reader.

If it is Level 3 Security, the process proceeds to step 212, where the system verifies whether the reader is a new reader. If the reader is a new reader, the process concludes at step 214, where the system denies authorization and displays a corresponding message inside the HTML document.

Alternatively, if the reader is not a new reader, the process proceeds to step 215, where the system determines whether the reader is banned. If access has been banned, the process concludes at step 214, where the system denies authorization and displays a corresponding message inside the HTML document.

If the reader is not banned, the process proceeds to step 216, where the system verifies the code and cookies.

If the verification code is invalid, the process concludes at step 213, where the system requests access to display/launch the document.

If the verification code is valid, the process proceeds to step 217, where the system verifies whether a maximum reads limit has been exceeded, if applicable.

If a maximum reads limit has been exceeded, the process concludes at step 214, where the system denies authorization and displays a corresponding message inside the HTML document.

If no maximum reads limit has been exceeded, the process concludes at step 209 where the system returns the authentication code to the server, indicating that it is permissible to display/launch the document, thereby granting access to the reader.

The following code segment illustrates the part of the coding for one embodiment of the present disclosure, which can be read together with FIG. 11. The code snip is a part of the server-side code that authenticates a RPD .HTML file with the server when the RPD .HTML file connects with the server at the recipient.

```
response = (int)Responses.responses.denied;
    msg = "This message is not yet available.";
    evnt.explanation = (int)Responses.reasons.notLaunched;
    saveEvent(evnt);
    JObject rsp1 = new(
        new JProperty("status", response),
        new JProperty("message", msg)
    );
    return Ok(rsp1.ToString( ));
}
if (doc.ipRestricted | | continentBanned(evnt.continentCode, doc.bannedCountries))
{
    long remote = ConvertIPToLong(remoteIp);
    long startIp = ConvertIPToLong(doc.allowedIpStart);
    long endIp = ConvertIPToLong(doc.allowedIpEnd);
    if ((remote < startIp) | | (remote > endIp))
    {
        response = (int)Responses.responses.denied;
        msg = "Sorry. You are not authorized to read this message";
        evnt.explanation = (int)Responses.reasons.badIp;
        saveEvent(evnt);
        JObject rsp1 = new(
            new JProperty("status", response),
            new JProperty("message", msg)
        );
        return Ok(rsp1.ToString( ));
    }
}
if (address != null)
{
    for (int i = 0; i < doc.recipients.Count; i++)
    {
        if (doc.recipients[i].address == address) { reader = i; break; }
    }
}
if (cookie != null)
{
    for (int i = 0; i < doc.recipients.Count; i++)
```

```
        {
            if (doc.recipients[i].cookieId == cookie)
            {
                address = doc.recipients[i].address;
                reader = i;
                break;
            }
        }
    }
    switch (doc.securityLevel)
    {
        case 1:
            //Security level 1 allows anyone to read but tracks openings by IP.
            response = (int)Responses.responses.allowed;
            session = evnt.event_id;
            if (reader == -1)
            {
                Sessions.Add(session, 0, doc.recipients[0].address, doc.steg);
            }
            else
            {
                Sessions.Add(session, 0, doc.recipients[reader].address, doc.steg);
            }
            if (cookie == doc.recipients[0].cookieId)
            {
                evnt.explanation = (int)Responses.reasons.reopen;
            }
            else
            {
                evnt.explanation = (int)Responses.reasons.opened;
                cookie = doc.recipients[0].cookieId;
            }
            break;
        case 2:
            if (reader > -1)
            {
                if ((doc.recipients[reader].verifyCode == verify) | | (doc.recipients[reader].cookieId
== cookie))
                {
                    if (doc.recipients[reader].banned)
                    {
                        response = (int)Responses.responses.denied;
                        msg = "Access denied";
                        evnt.explanation = (int)Responses.reasons.bannedRecipient;
                    }
                    else if ((doc.maxReads > 0) && (doc.recipients[reader].timesRead >
doc.maxReads))
                    {
                        response = (int)Responses.responses.denied;
                        msg = "Sorry! The reading limit for this document has been exceeded";
                        evnt.explanation = (int)Responses.reasons.maxReads;
                    }
                    else
                    {
                        if (cookie == doc.recipients[reader].cookieId)
                        {
                            evnt.explanation = (int)Responses.reasons.reopen;
                        }
                        else
                        {
                            evnt.explanation = (int)Responses.reasons.verified;
                        }
                        evnt.agent = address;
                        response = (int)Responses.responses.allowed;
                        session = evnt.event_id;
                        if (reader == -1)
                        {
                            Sessions.Add(session, 0, doc.recipients[0].address, doc.steg);
                        }
                        else
                        {
                            Sessions.Add(session, reader, doc.recipients[reader].address, doc.steg);
                        }
                        cookie = doc.recipients[reader].cookieId;
                        if (doc.recipients[reader].firstRead == DateTime.MinValue)
                        {
                            doc.recipients[reader].firstRead = DateTime.UtcNow;
                        }
                        doc.recipients[reader].timesRead += 1;
```

```
            rpdb.updateDoc(doc);
        }
    }
    else if (verify != doc.recipients[reader].verifyCode)
    {
        if (verify != null)
        {
            msg = "Invalid verification code ";
            evnt.explanation = (int)Responses.reasons.badVerify;
            response = (int)Responses.responses.verifyRequired;
        }
        else
        {
            msg = "Please enter a verification code.";
            evnt.explanation = (int)Responses.reasons.verificationRequested;
            response = (int)Responses.responses.verifyRequired;
        }
    }
}
else if (address != null)
{
    if (doc.domains.Contains(domainOf(address),
StringComparison.OrdinalIgnoreCase))
    {
        response = (int)Responses.responses.denied;
        msg = "Access denied";
        evnt.explanation = (int)Responses.reasons.badDomain;
    }
    else
    {
        evnt.agent = address;
        Recipient newRec = new(address);
        newRec.source = doc.recipients[0].address;
        doc.recipients.Add(newRec);
        rpdb.updateCurrentDoc(doc);
        //if (doc.voting)
        //{
        //  voting = true;
        //  voted = newRec.vote;
        //}
        msg = "You must enter a valid verification code.";
        evnt.explanation = (int)Responses.reasons.verificationRequested;
        response = (int)Responses.responses.verifyRequired;
    }
}
else
{
    response = (int)Responses.responses.verifyRequired;
    msg = "Verfication Required";
    evnt.explanation = (int)Responses.reasons.badVerify;
}
break;
case 3:
    if (reader > -1)
    {
        if (verify == doc.recipients[reader].verifyCode || doc.recipients[reader].cookieId
== cookie)
        {
            if (doc.maxReads > 0)
            {
                if (doc.recipients[reader].timesRead >= doc.maxReads)
                {
                    response = (int)Responses.responses.denied;
                    msg = "Reading limit exceeded";
                    evnt.explanation = (int)Responses.reasons.maxReads;
                }
            }
            else
            {
                if (doc.recipients[reader].firstRead == DateTime.MinValue)
                {
                    doc.recipients[reader].firstRead = DateTime.UtcNow;
                }
                doc.recipients[reader].timesRead += 1;
                rpdb.updateDoc(doc);
                response = (int)Responses.responses.allowed;
                session = evnt.event_id;
                if (reader == -1)
                {
```

-continued

```
        Sessions.Add(session, 0, doc.recipients[0].address, doc.steg);
      }
      else
      {
        Sessions.Add(session, 0, doc.recipients[reader].address, doc.steg);
      }
      cookie = doc.recipients[0].cookieId;
      evnt.explanation = (int)Responses.reasons.verified;
      evnt.agent = address;
    }
  }
}
else if (address is not null)
{
  response = (int)Responses.responses.denied;
  msg = "Access denied";
  evnt.explanation = (int)Responses.reasons.verificationRequested;
}
else
{
  msg = "You must enter a valid verification code.";
  evnt.explanation = (int)Responses.reasons.verificationRequested;
  response = (int)Responses.responses.verifyRequired;
}
break;
}
evnt.response = response;
saveEvent(evnt);
JObject rsp = new(
  new JProperty("status", response),
  new JProperty("message", msg),
  new JProperty("cookie", cookie),
  new JProperty("session", session)
);
return Ok(rsp.ToString( ));
```

Figure 12:
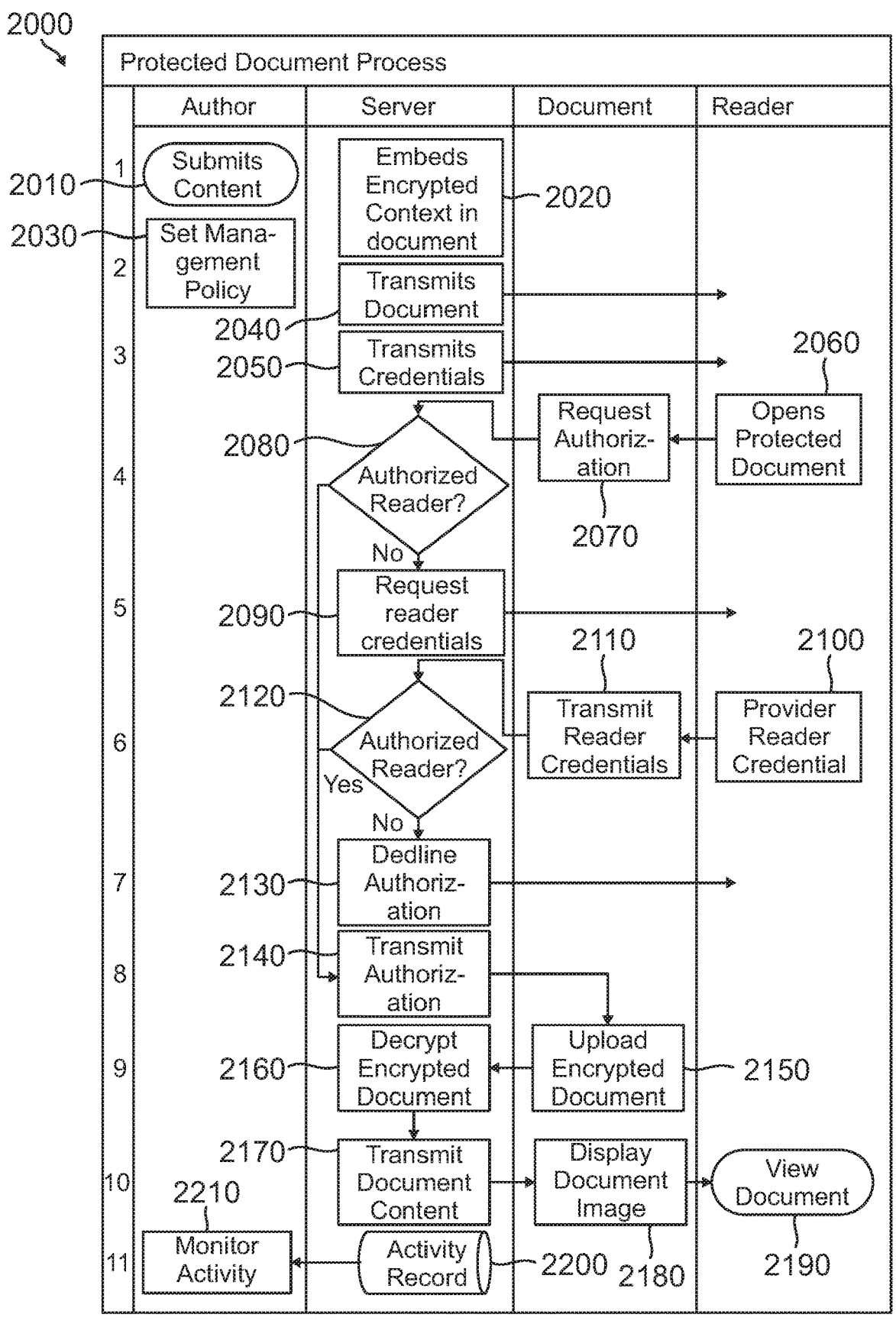
FIG. 12 is a cross-functional flowchart detailing an RPD creation and access procedure according to an embodiment of the present invention.

FIG. 12 is cross-functional flowchart detailing an RPD creation and access procedure according to an embodiment of the present invention. The flowchart describes the embodiment by showing the relationship between four elements: (i) the Author (also known as the document "Originator"), (ii) the system server, (iii) the Document (RPD as a .HTML File), and (iv) the recipient or Reader.

Phase 1: In step 2010, the Author submits the content to the server using an interface such as the Document Receiving Unit Interface 300 of FIG. 3, an API, SMTP email relay, or other interface. Subsequently, in step 2020 the server transfers the content into a uniform format and encrypts the content into the RPD .HTML document.

Phase 2: In step 2030 the Author sets the controls information and the management policy for access to the document. In step 2040, the management policy is transmitted as controls information to the server using the Document Receiving Unit Interface 300 shown in FIG. 3, an API, SMTP email relay, or other such means.

Phase 3: In step 2050, the packaged RPD .HTML document is transmitted to the reader, which may be displayed on the Email Attachment Display Interface 600, as shown in FIG. 6.

Phase 4: In step 2060, the reader opens the protected RPD .HTML document, and in step 2070, the document requests authorization verification at the server, during which the RPD File Viewer may view the Encrypted RPD File Viewer Interface 700, as shown in FIG. 7.

Phase 5: In step 2080, the server determines whether the reader is authorized. If the reader is authorized, the process skips to phase 10, whereas if the reader is not authorized, the process continues to phase 6.

Phase 6: In step 2090, the server requests reader credentials.

Phase 7: In step 2100, the reader provides their reader credentials, and in step 2110 the document transmits the reader credentials to the server. This phase is characterized as process to transmit credentials for access in order to verify that the reader has the appropriate access authorization.

Phase 8: In step 2120, the server again determines whether the reader is authorized. If the reader is authorized, the process skips to phase 10, whereas if the reader is not authorized, the process continues to phase 9.

Phase 9: In step 2130, the server sends a decline authorization display into the HTML document at the reader, thereby concluding the process for the unauthorized reader.

Phase 10: In step 2140, since the reader is authorized, the server transmits authorization to the document.

Phase 11: In step 2150, the encrypted document is uploaded from within the RPD .HTML File to the server, then in step 2160, the server decrypts the encrypted document.

Phase 12: In step 2170, the document content is transmitted from the server to the RPD .HTML File, which in step 2180 displays an image of each page as it is transmitted to the RPD. HTML File. Notably, all pages are images and each page it transmitted as one page image at a time, triggered by the page scroll inside the RPD .HTML File that sends a signal to the server as to which page to transmit and when. Subsequently, in step 2190, the reader views the protected document, for instance in an Opened RPD File Viewer Interface 800, as shown in FIG. 8.

Phase 13: In step 2200, the server monitors and stores the activity, and in step 2210, the activity is displayed to the Author in an interface, for example in the Activity Data Display Interface 500, as shown in FIG. 5.

FIG. 13 illustrates an exemplary computer system 1300 which may be used with some embodiments of the present invention, which may be, for example, a server or a client computer system. Computer system 1300 may take any suitable form, including but not limited to, an embedded computer system, a system-on-chip (SOC), a single-board computer system (SBC) (such as, for example, a computer-on-module (COM) or system-on-module (SOM)), a laptop or notebook computer system, a smart phone, a personal digital assistant (PDA), a server, a tablet computer system, a kiosk, a terminal, a mainframe, a mesh of computer systems, etc. Computer system 1300 may be a combination of multiple forms. Computer system 1300 may include one or more computer systems 1300, be unitary or distributed, span multiple locations, span multiple systems, or reside in a cloud (which may include one or more cloud components in one or more networks).

In one embodiment, computer system 1300 may include one or more processors 1301, memory 1302, storage 1303, an input/output (I/O) interface 1304, a communication interface 1305, and a bus 1306. Although this disclosure describes and illustrates a particular computer system having a particular number of particular components in a particular arrangement, this disclosure contemplates other forms of computer systems having any suitable number of components in any suitable arrangement.

In one embodiment, processor 1301 includes hardware for executing instructions, such as those making up software. Herein, reference to software may encompass one or more applications, byte code, one or more computer programs, one or more executable module or API, one or more instructions, logic, machine code, one or more scripts, or source code, and or the like, where appropriate. As an example and not by way of limitation, to execute instructions, processor 1301 may retrieve the instructions from an internal register, an internal cache, memory 1302 or storage 1303; decode and execute them; and then write one or more results to an internal register, an internal cache, memory 1302, or storage 1303. In one embodiment, processor 1301 may include one or more internal caches for data, instructions, or addresses. Memory 1303 may be random access memory (RAM), static RAM, dynamic RAM or any other suitable memory. Storage 1305 may be a hard drive, a floppy disk drive, flash memory, an optical disk, magnetic tape, or any other form of storage device that can store data (including instructions for execution by a processor).

In one embodiment, storage 1303 may be mass storage for data or instructions which may include, but not limited to, a HDD, solid state drive, disk drive, flash memory, optical disc (such as a DVD, CD, Blu-ray, and the like), magneto optical disc, magnetic tape, or any other hardware device which stores computer readable media, data and/or combinations thereof. Storage 1303 may be be internal or external to computer system 1300.

In one embodiment, input/output (I/O) interface 1304 includes hardware, software, or both for providing one or more interfaces for communication between computer system 1300 and one or more I/O devices. Computer system 1300 may have one or more of these I/O devices, where appropriate. As an example but not by way of limitation, an I/O device may include one or more mouses, keyboards, keypads, cameras, microphones, monitors, displays, printers, scanners, speakers, cameras, touch screens, trackball, trackpad, biometric input device or sensor, or the like.

In still another embodiment, a communication interface 1305 includes hardware, software, or both providing one or more interfaces for communication between one or more computer systems or one or more networks. Communication interface 1305 may include a network interface controller (NIC) or a network adapter for communicating with an Ethernet or other wired-based network or a wireless NIC or wireless adapter for communications with a wireless network, such as a Wi-Fi network. In one embodiment, bus 1306 includes any hardware, software, or both, coupling components of a computer system 1300 to each other.

FIG. 14 is a graphical representation of an exemplary network 1400 that may be used to facilitate the various embodiments of the present invention. Server 1405 is operated by a services organization 1420, and typically includes at least one processor, input and output equipment or devices, memory, storage, and a communication interface. The server 1405 also operates under the control of specialized software programming commands that are designed to carry out the various processes described above. It should be understood that while the exemplary network 1400 is described in terms of a server 1405 operated by a services organization 1420, the server 1405 could be operated by a third party hired by the services organization or under the control of the services organization. The server 1405 could also be operated by a third party independent of the services organization, which then provides information and/or data to the services organization from which the services organization may provide services to a client 1425 of the services organization.

A data storage device 1410, which may be separate from the server 1405, but not necessarily, may be accessible to the server 1405, and may be used for storing date related to information and any other data related to operation of the various embodiments of the system and method described above. The data storage device 1410 may directly connected to the server 1405, or it may be accessible to the server 1405 through a network or the Internet 1415. The data storage device 1410 may also be a virtual storage device or memory located in the Cloud.

These diagrams are describing some embodiments of the various embodiments of this disclosure, those skilled in the art will understand that there are other embodiments and more details within each of these embodiments not depicted in these diagrams.

Although the disclosed system has been described hereabove with reference to certain examples or embodiments, various additions, deletions, alterations and modifications may be made to those described examples and embodiments without departing from the intended spirit and scope of the disclosed heat exchange system. For example, any elements, steps, members, components, compositions, reactants, parts or portions of one embodiment or example may be incorporated into or used with another embodiment or example, unless otherwise specified or unless doing so would render that embodiment or example unsuitable for its intended use. Also, where the steps of a method or process have been described or listed in a particular order, the order of such steps may be changed unless otherwise specified or unless doing so would render the method or process unsuitable for its intended purpose. Additionally, the elements, steps, members, components, compositions, reactants, parts or portions of any embodiment or example described herein may optionally exist or be utilized in the absence or substantial absence of any other element, step, member, component, composition, reactant, part or portion unless otherwise noted. All reasonable additions, deletions, modifications and alterations are to be considered equivalents of the described examples and embodiments and are to be included within the scope of the following claims. The disclosure is limited only by the scope of the appended claims.

FIGS. 15, 16, and 17 demonstrate some distinctions between the respective Level 1 Security, Level 2 Security, and Level 3 Security.

FIG. 15 shows a simplified schematic of the system functions according an embodiment of the present invention. A Document Owner 1510 engages in a Sender Experience 1520 in which an RPD document is created and either shared or downloaded. Subsequently, the Document Owner 1510 utilizes the Security Level Selection Module 1530 to select a desired level of security, each of which include differing features and restrictions.

Level 1 Security 1531 is referred to as the Track Views level. Tracking views provides the Document Owner 1510 insights into how many times and in what geographic locations the rights protected document has been opened and viewed. Level 1 Security 1531, imposes no requirements on the recipient other than to open and view documents. In a variation of Level 1 Security 1531, the Track Views & Restrict level, Document Owners 1510 can opt to restrict viewing to certain geographic locations or other internet locations such as only within their corporate network. Document Owners 1510 may additionally choose to protect the content by scheduling a precise document availability, and may apply additional advanced content protections to the document, including: (i) Proof of sending, (ii) Watermarking the document with visible marks, (iii) Timestamping the original document, (iv) Print restricting, (v) Permitting in-document message responses to the Originator, (vi) Generating authorized reader identity-marking to track a photo-capturing leaker, and (vii) Killing a document and all of its traces.

Level 2 Security 1532 is referred to as the Track Readers level. Tracking readers provides the Document Owner 1510 insights into how many times and in what geographic locations the document has been opened and viewed, with insights tagged to each reader. Readers are identified, associated with their authenticated email address. Insights are displayed to the Originator in a web-based activity log, displaying: (i) Notification of reading, (ii) Who read what and when, (iii) Tracked distribution, such as forwards, (iv) How many times the original document was read, (v) Time duration of each viewer's reading, and (vi) Geographic IP location of each reading.

The Track Readers level provides additional functionalities relating to Voting and In-Document Interactivity. This feature enables real-time in-document interactivity by allowing the document Originator to append notes to a document that are viewed by readers inside the document itself, and to carry out reader polls. Viewers can record their votes, comments or leave questions for the Originator. Votes may be recorded for each tracked reader and are tallied for the Originator in a web dashboard to easily track and view both the individual votes as well as the aggregate vote tally for each document. The Originator may further choose to permit each viewer to see how others with document access have voted, or the Originator may restrict the vote tally and vote details so that only the Originator has view of the vote results. The vote tally is updated in real time in the form of "Likes" and "Dislikes", as votes are added. These features may for instance be activated via the Real-Time Interactivity Module 320 in the Document Receiving Unit Interface 300.

Level 3 Security 1533 is referred to as the Restrict Readers level. Level 3 Security 1533 provides the original sender all the controls and insights of Track Readers: Level 2 Security 1532, plus additionally allows the Originator to restrict who can read the rights-protected document. Readers are tracked and restricted (or provided access) via two-factor authentication to assure the reader associated with their email address is in fact who the Originator has authorized to access the rights protected document. Additionally, Level 3 Security 1533 provides an extra layer of protection by allowing the document Originator to: (i) Restrict viewing of the document to a registered viewer, and (ii) Restrict forwarding (distribution) of the document by a viewer.

The Document Owner 1510 may additionally utilize the Feature Selection Module 1540 to specify features and restrictions on the document. The Feature Selection Module 1540 may be the Document Receiving Unit Interface 300 of FIG. 3, which comprises an Access Controls Module 310, a Real-Time Interactivity Module 320, a Location Protections Module 330, and a Content Protections Module 340. The document is ultimately transmitted to the Document Reader 1550 with all the selected features applied.

FIG. 16 is a simplified flowchart outlining the RPD transmittal and authentication process according to an embodiment of the present invention. In this process, a RPD document is transmitted from a Document Owner 1610 to a Document Reader 1650. For a document with Level 1 Security 1621, the document is transmitted directly to the Document Reader 1650 as an HTML Document 1630, as no authentication is required since anonymous viewing is permissible. In contrast, for documents with Level 2 Security 1622 or Level 3 Security 1623, an Authentication 1640 is required before a Document Reader 1650 may access it.

FIG. 17 shows a comparison of access control features for the respective security levels 1531/1621, 1532/1622, 1533/1623. The Level 1 Security Access Control Menu 1710 lists the features associated with Level 1 Security 1531/1621. The Level 2 Security Access Control Menu 1720 lists the features associated with Level 2 Security 1532/1622. The Level 3 Security Access Control Menu 1730 lists the features associated with Level 3 Security 1533/1623. This includes all features available in the Level 2 Security Access Control Menu 1720, but also includes an additional option to activate "Restricted Distribution".

In the abovementioned figures, the following provides more details:

FIG. 1, 1030 creation is further described at (A) below. 1042 Information control preparation unit is further described at (B) below. 1046 Controlled Information Transmit Unit is further described at (C) below.

FIG. 2, 30 receive entire content encrypted is further described at (A) below. 36 Prepare at the system server is further described at (B) below. 37 Transmit content to viewer is further described at (C) below.

FIG. 7, 3, the entire message content is received encrypted is further described at (A) below. FIG. 9, 30 receive entire content encrypted is further described at (A) below. 36 preparing is further described at (B) below. 37 Transmit content at viewer is further described at (C) below.

FIG. 10, 130 receive entire content encrypted is further described at (A) below. 136 Prepare is further described at (B) below. 137 Transmit content at viewer is further described at (C) below. FIG. 12, 2150 entire document uploaded is further described at (A) below, 2170 transmit document content is further described at (B) below. 2180 displayed images is further described at (C) below.

(A) Pre-Process to Create the Encrypted Package to Transmit

The original sent document pre-processed into a standard document format to speed future imaging processing plus the original sent control instructions and the transaction document ID generated at the time of pre-processing are encapsulated within the encrypted content received.

After the click to open the RPD at the viewer, (B) Prepare at the System Server

Document ID and some metadata (may include recipient/reader email address based on control instructions) is passed from viewer to system server if document is (by originator rules) killed or expired, max authorized or remaining reads per reader, units available, or otherwise not authorized by location, etc. as determined from passed metadata and Doc ID lookup compared to controls in the database at the system, then system sends message to viewer to display message document not available.

if document is (by originator rules) alive or can be permitted to be viewed, then the system server sends signal to the viewer to transmit the document (encrypted document package that contains the document and full metadata of controls information and document ID) to the system server.

(C) Transmit Content to Viewer

At server upon receipt of the encrypted document package, encrypted document package is decrypted document is prepared based on the controls information, with preparation to at least include for a subset of pages, creating an image of each page delivering the image of the viewer requested page to view to the viewer (only that page)

holding the other imaged pages in memory until the viewer opts to view another page.

if the viewer opts to view a page that has not yet been put in image, then that requested page and pages surrounding are imaged that requested page is delivered.

At viewer, instructed by server not to cache images (not store in memory at viewer).

LISTING OF REFERENCE NUMERALS

Send Initiated 11
Input Device and Receive Documents & Instructions 12
Database Record of Transaction ID With Instructions 13
RPD Document Creation Applying Instructions 14
Instructions For Send by Email 15
Generate Email Message with RPD File Attached 16
Transmit RPD 17
RPD File Database 18
API For RPD Send Retrieve 19
RPD File Receiver 21
RPD File Viewer 22
Input Device for Receiving Encrypted Content of RPD From External User Request To Access 30
Retrieve Instructions Related to Transaction ID 31
Is File Available 32
Return Expired Display Message 33
User Authorized? 34
Initiate User Access Verification Process 35
Prepare Transmission for Decrypted File to RPD With Instructions Applied to Content 36 Transmit Content to The RPD File at Viewer 37
Input Device to Receive Data About Viewing on Interactivity 41
Activity Database 42
Interactive Data 43
Display Activity Data to Originator 44

Activity Data Viewer 45
Interactive Data Update to RPD At Viewer 46
Send Initiated 111
Input Device and Receive Documents & Instructions 112
Converting Original Document into Standard Format 113
Database Record of Transaction ID With Instructions 114
Creating A Unique Copy of The Document for Each Recipient 115
Transmit RPD 117
RPD File Receiver 121
RPD File Viewer 122
Input Device Receiving Unique Identifier, Encrypted Content of RPD From External User Request to Access 130
Retrieve Instructions Related to Transaction ID 131
Is File Access Available 132
Return Expired Display Message 133
User Authorized? 134
Initiate User Access Verification Process 135
Prepare Transmission of Decrypted File to RPD With Instructions Applied to Content 136
Transmit Content to The RPD File at Viewer 137
Unique Session Keys 141
Web Server For Document Display 142
Session Activity Database 150
Web Server View Access of Activity for Originator 151
Authorization Request 201
Document ID Address Verify Cookie ID 202
Document Exists 203
Load Document Control Settings 204
Expired/Not Launched? 205
Deny Authorization 206
Banned IP/Location 207
Security Level 208
Return Authorization Code 209
New Reader? 210
Record Reader 211
New Reader? 213
Deny Authorization 214
Reader Banned 215
Valid Verify Code/Cookie 216
Max Reads Exceeded 217
Document Receiving Unit Interface 300
Access Controls Module 310
Real-Time Interactivity Module 320
Location Protection Module 330
Content Protections Module 340
Updated Instructions Input Interface 400
Kill Selected Button 410
Status Column 420
Activity Data Display Interface 500
Activity Data Table 510
Activity Data Profile 520
Email Attachment Display Interface 600
Encrypted RPD File Viewer Interface 700
Opened RPD File Viewer Interface 800
Application Processing Unit 1000
Document Receiving Unit 1010
Processing Instructions Unit 1020
RPD File Creation & Send Unit 1030
Activity Unit 1040
Validating Access Request Unit 1042
Information Control Preparation Unit 1044
Controlled Information Transmit Unit 1046
Activity History Management Unit 1048
Interactive Content Processing Unit 1050
Input/Output Unit 1110

Input Unit 1110
Message Dialog Box Unit 1120
Display Unit 1130
Output Unit 1140
Central Processing Unit 1200
User Management Unit 1210
Database Unit 1220
Memory Unit 1230
Server 1240
Validation Unit 1250
Computer System 1300
Processor 1301
Memory 1302
Storage 1303
I/O Interface 1304
Communication Interface 1305
Bus 1306
Network 1400
Server 1405
Data Storage Device 1410
Internet/Network 1415
Provider 1420
Client 1425
Document Owner 1510
Sender Experience 1520
Security Level Selection Module 1530
Level 1 Security 1531
Level 2 Security 1532
Level 3 Security 1533
Feature Selection Module 1540
Document Reader 1550
Document Owner 1610
Level 1 Security 1621
Level 2 Security 1622
Level 3 Security 1623
HTML 1630
Authentication 1640
Document Reader 1650
Level 1 Security Access Control Menu 1710
Level 2 Security Access Control Menu 1720
Level 3 Security Access Control Menu 1730
Protected Document Process 2000
Submit Content 2010
Set Management Policy 2020
Embeds Encrypted Content in Document 2030
Transmits Document 2040
Transmits Credentials 2050
Opens Protect Document 2060
Request Authorization 2070
Authorized Reader? 2080
Request Reader Credentials 2090
Provider Reader Credential 2100
Transmit Reader Credentials 2110
Authorized Reader? 2120
Decline Authorization 2130
Transmit Authorization 2140
Upload Encrypted Document 2150
Decrypt Encrypted Document 2160
Transmit Document Content 2170
Display Document Image 2180
View Document 2190
Activity Record 2200
Monitor Activity 2210

What is claimed is:

1. An electronic document transformation and sharing system allowing a document originator control over an electronic document shared by the document originator with at least one recipient, said system comprising:

an input device configured to receive an original electronic document and document-specific controls instructions pertaining to said original electronic document, and to assign a transaction ID pertaining to said original electronic document;

a web server the web server comprising;

a database on said web server, storing transaction IDs with correlating controls instructions pertaining to said original electronic document;

a document transformation module that is in data transmission connection with (1) said input device that receives the original electronic document and (ID) the database that stores the transaction IDs with correlating controls instructions for said original electronic document, the document transformation module configured to transform said original electronic document to an encrypted transformation document and embed said transaction ID in encrypted or unencrypted form into the encrypted transformation; and a data transmission subsystem configured to transmitting the transformation document to at least one recipient directly or to the originator for tent transmittal to the at least one recipient, such the encn cument is not stored on the server; and an electronic transformation document viewer for viewing said encrypted transformation document by the at least one recipient, said document viewer configured at least for JavaScript execution and ocument rendering and being in data transmission connection with said database;

wherein said electronic transformation document viewer is configured to transmit the encrypted transformation document to the server for decryption;

wherein after transaction ID verification between the encrypted transformation document and the transaction ID stored in said database if said document-specific controls instructions correlating to said transaction ID are met, the web server is configured to decrypt the encrypted transformation document, and the electronic transformation document viewer is configured to make the decrypted transformation document visible;

wherein the web server transmits back the encrypted transformation document to the document viewer as a view accessible representation of the original electronic document, that view accessible representation being an image of one page, wherein each page is transmitted independently when the viewer indicates a request to view a different page; and wherein the web server is configured to delete the temporarily stored decrypted transformation document after the recipient finishes viewing.

2. The electronic document transformation and sharing system of claim 1 wherein the document viewer is configured to display a notification to the recipient indicating access is not available if said document-specific controls instructions correlating said transaction ID are not met.

3. The electronic document transformation and sharing system of claim 1 wherein the document viewer is configured to transmit an indication to said web server.

4. The electronic document transformation and sharing system of claim 3 wherein the indication is a like, dislike or vote.

5. The electronic document transformation and sharing system of claim 3, wherein the web server stores a third database storing indications received at the web server, wherein said indications that the document is permissible to be viewed are transmitted from the web server into the encrypted transformation document when said encrypted transformation document is re-opened, refreshed, or connectivity permits.

6. The electronic document transformation and sharing system of claim 1, wherein the controls information prescribes to restrict access or functionality in the encrypted transformation document based on one or more of the following controls information from the group consisting of: printing, timestamping, watermarking, limiting viewing by IP range, limiting viewing by viewer domain, limiting viewing by start time of expire time, limiting viewing by information deletion, and tracking viewing by use of steganography.

7. The electronic document transformation and sharing system of claim 1, wherein the controls information prescribes to add a watermark on the document viewed, that watermark being associated with the identity of the viewer, and that watermark changing with each subsequent permitted and authenticated viewer to be associated with the subsequent viewer.

8. The electronic document transformation and sharing system of claim 1 wherein the encrypted transformation document is prepared to be associated with a unique viewer identity.

9. The electronic document transformation and sharing system of claim 8 wherein the unique viewer identity is an email address.

10. The electronic document transformation and sharing system of claim 8 wherein the encrypted transformation document is transmitted to a storage directory with an identifier of the unique viewer with permitted access to the encrypted transformation document.

11. The electronic document transformation and sharing system of claim 1 wherein the encrypted transformation document is transmitted to a storage directory for later access by a viewer.

12. The electronic document transformation and sharing system of claim 1 wherein the encrypted document transformation module is configured to discard the original document after the encrypted transformation document was created.

13. The electronic document transformation and sharing system of claim 1 wherein the system input device is programmed to receive a first transmission when the encrypted transformation document initiates the open process in the viewer, wherein the first transmission comprises a data package that includes a portion of a set of file data comprising preliminary metadata for the system input device to evaluate to determine the status of the encrypted transformation document before accepting a second transmission;

the second transmission is an encrypted content package that contains the set of file data in its entirety; and the data package includes the preliminary metadata about the encrypted transformation document including at least the transaction ID, the input device is configured to check the first-database for that encrypted transformation document status associated with that transaction ID, and if not expired or otherwise not permissible to be viewed by the recipient, is configured to return a signal to the encrypted transformation document or file viewer to transmit the rest of the encrypted content package that is the content of the encrypted transformation document and remaining metadata.

14. The electronic document transformation and sharing system of claim 1, wherein the data transmission subsystem includes a server separate from the recipient wherein the server is programmed to identify whether an email sent by the originator includes at least one electronic document as an attachment, and if so, separates the at least one attached electronic document from the email, transforms the at least one attached electronic document into the encrypted transformation document by submitting it with a create process via a second API to the server creating the encrypted transformation document, wherein the second API is configured to return and attach the encrypted transformation document to the email, thereby replacing the email attachment in form of the original electronic document with the encrypted transformation document, then transmitting the encrypted transformation document to the recipient as a new replacement email attachment.

15. A method of electronic document transformation and sharing allowing a document originator control over an electronic document shared by the document originator with at least one recipient, said method comprising:

the originator submitting an electronic document with controls instructions into a database on a server;

the server generating a transaction ID and an encrypted transformation document, and embedding the transaction ID into the encrypted transformation document;

transmitting the encrypted transformation document to the at least one recipient directly or to the originator for subsequent transmittal to the at least one recipient, such that the encrypted document is not stored on the server; and upon attempting to open the encrypted transformation document, the encrypted transformation document initiating a request for authorization;

the server determining whether the recipient is an authorized reader, and if not, declining the authorization, and if yes, authorizing the upload of the encrypted transformation document onto the server, decrypting the encrypted transformation document and sending the decrypted transformation document to an electronic transformation document viewer to be viewed by the recipient transmitting back, through the encrypted transformation document, a view accessible representation of the original electronic document to the document viewer, that view accessible representation being an image of one page;

transmitting back each page independently when the viewer indicates a request to view a different page; and deleting the decrypted transformation document from the web server after the recipient finishes viewing.

* * * * *